US012803673B2

(12) United States Patent
Watanabe et al.

(10) Patent No.: US 12,803,673 B2
(45) Date of Patent: Nov. 17, 2026

(54) DATA GENERATION METHOD FOR CONTROLLING A SPATIAL LIGHT MODULATOR, DATA GENERATION PROGRAM FOR CONTROLLING A SPATIAL LIGHT MODULATOR, AND DATA GENERATION DEVICE FOR CONTROLLING A SPATIAL LIGHT MODULATOR

(71) Applicant: HAMAMATSU PHOTONICS K.K., Hamamatsu (JP)

(72) Inventors: Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 273 days.

(21) Appl. No.: 18/644,329

(22) Filed: Apr. 24, 2024

(65) Prior Publication Data

US 2024/0361620 A1 Oct. 31, 2024

(30) Foreign Application Priority Data

Apr. 28, 2023 (JP) ................................ 2023-074832

(51) Int. Cl.
*H04B 10/516* (2013.01)
*H04B 10/508* (2013.01)

(52) U.S. Cl.
CPC ......... *H04B 10/516* (2013.01); *H04B 10/508* (2013.01)

(58) Field of Classification Search
CPC ........................... H04B 10/516; H04B 10/508
See application file for complete search history.

(56) References Cited

U.S. PATENT DOCUMENTS

2008/0170218 A1* 7/2008 Dantus .................. G01N 21/65 372/3
2016/0329246 A1* 11/2016 Nakano ................ B23K 26/046

FOREIGN PATENT DOCUMENTS

JP 2018-036486 A 3/2018
JP 2018036484 A * 3/2018

OTHER PUBLICATIONS

Hacker, M. et al., "Iterative Fourier transform algorithm for phase-only pulse shaping," Optics Express, vol. 9, No. 4, pp. 191-199, Aug. 13, 2001.
Ripoll, Olivier et al., "Review of iterative Fourier-transform algorithms for beam shaping applications," Optical Engineering, vol. 43, No. 11, pp. 2549-2556, Nov. 2004.

(Continued)

*Primary Examiner* — Casey L Kretzer
(74) *Attorney, Agent, or Firm* — Faegre Drinker Biddle & Reath LLP

(57) ABSTRACT

A data generation method of the present disclosure is a method for generating data for controlling a spatial light modulator. The data generation method includes: preparing a plurality of initial phase spectrum functions; generating each of a plurality of pieces of preliminary data for controlling the spatial light modulator by using each of the plurality of initial phase spectrum functions; and selecting at least one of the plurality of pieces of preliminary data and setting the at least one piece of preliminary data as the data for controlling the spatial light modulator.

15 Claims, 29 Drawing Sheets

(56) References Cited

OTHER PUBLICATIONS

Tohru Takahashi, et al., “Numerical Investigation of the Stagnation Problems of an Iteractive Phase-Retrieval Algorithm”, Optics, Japan, The Japan Society of Applied Physics, vol. 21, No. 2,, 1992, p. 119-p. 127.
Yasuhiko Torii, et al., “Optimized coding of computer generated holograms using deterministic initial phase added to target images”, Proceedings of the 53rd Spring Meeting of the Japan Society of Applied Physics and Related Societies, vol. 3, 3rd issue, Japan, The Japan Society of Applied Physics, 23a-E-10, 2006, p. 1077.

* cited by examiner

C3
C4
(1)
(2)
(3)
(4)
(5)
(6)
(7-a)
(7-b)

DATA GENERATION METHOD FOR CONTROLLING A SPATIAL LIGHT MODULATOR, DATA GENERATION PROGRAM FOR CONTROLLING A SPATIAL LIGHT MODULATOR, AND DATA GENERATION DEVICE FOR CONTROLLING A SPATIAL LIGHT MODULATOR

CROSS REFERENCE

Priority is claimed on Japanese Patent Application No. 2023-074832, filed Apr. 28, 2023, the content of which is incorporated herein by reference.

TECHNICAL FIELD

The present disclosure relates to a data generation method, a data generation program, and a data generation device.

BACKGROUND

Patent Literature 1 (Japanese Unexamined Patent Publication No. 2018-036486) and Non Patent Literature 1 (M. Hacker, G. Stobrawa, T. Feurer, "Iterative Fourier transform algorithm for phase-only pulse shaping", Optics Express, Vol. 9, No. 4, pp. 191 to 199, 13 Aug. 2001) disclose a technique for shaping an optical pulse by modulating the spectral phase and/or the spectral intensity using a spatial light modulator (SLM). In Non Patent Literature 1, the spectral phase and the spectral intensity for obtaining a desired optical pulse waveform are calculated by using an iterative Fourier method. In Patent Literature 1, wavelength components (frequency components) of light forming the temporal intensity waveform are controlled. Also in Non Patent Literature 2 (Olivier Ripoll, Ville Kettunen, Hans Peter Herzig, "Review of iterative Fourier transform algorithms for beam shaping applications", Optical Engineering, Vol. 43, No. 11, pp. 2549 to 2556, November 2004), the iterative Fourier method is used to obtain a desired optical pulse waveform.

SUMMARY

For example, as a technique for controlling the temporal waveforms of various types of light such as ultrashort pulse light, there is a technique in which the spectral phase and the spectral intensity of the optical pulse are modulated by the SLM. In such a technique, a spectral phase and a spectral intensity for approximating the temporal intensity waveform of the light to a desired waveform are calculated, and a modulation pattern for applying the spectral phase and the spectral intensity to the light is presented to the SLM. Moreover, in addition to controlling the shape of the temporal intensity waveform, it is also possible to control the wavelength components (frequency components) of light forming the temporal intensity waveform (for example, see Patent Literature 1). When generating output light including a plurality of optical pulses, applications to various devices, such as a dispersion measurement device, a laser processing device, an ultra-high-speed imaging camera, and a terahertz wave generator, are possible by changing the wavelength for each of the plurality of optical pulse. In such a technique, it is important to obtain a modulation pattern for accurately realizing light having a desired temporal intensity waveform and wavelength components.

It is an object of the present disclosure to provide a data generation method, a data generation program, and a data generation device capable of obtaining a modulation pattern of an SLM to accurately realize light having a desired temporal intensity waveform and wavelength components.

A form of data generation method is a method for generating data for controlling an SLM. The data generation method includes a first step, a second step, and a third step. In the first step, a plurality of initial phase spectrum functions are prepared. In the second step, each of a plurality of pieces of preliminary data capable of controlling the SLM is generated by using each of the plurality of initial phase spectrum functions. In the third step, at least one of the plurality of pieces of preliminary data is selected and set as the data for controlling the SLM. The second step includes a first transform step, a second transform step, and a third transform step. In the first transform step, a first waveform function in a frequency domain including an intensity spectrum function and a phase spectrum function is transformed into a second waveform function in a temporal domain including a temporal intensity waveform function and a temporal phase waveform function. In the second transform step, a third waveform function in the temporal domain that includes a temporal intensity waveform function and a temporal phase waveform function and corresponds to a target intensity spectrogram generated in advance is calculated from the second waveform function. In the third transform step, the third waveform function is transformed into a fourth waveform function in the frequency domain including an intensity spectrum function and a phase spectrum function. In the second step, the first transform step, the second transform step, and the third transform step are repeatedly performed for each of the plurality of pieces of preliminary data while replacing the first waveform function with the fourth waveform function. At this time, in the first transform step at the beginning of repeated operations, each of the plurality of initial phase spectrum functions is set as the phase spectrum function of the first waveform function. In addition, each of the plurality of pieces of preliminary data is generated based on the phase spectrum function of the fourth waveform function obtained after the repeated operations.

A form of data generation program is a program for generating data for controlling an SLM. The data generation program causes a computer to execute a first step, a second step, and a third step. In the first step, a plurality of initial phase spectrum functions are prepared. In the second step, each of a plurality of pieces of preliminary data capable of controlling the SLM is generated by using each of the plurality of initial phase spectrum functions. In the third step, at least one of the plurality of pieces of preliminary data is selected and set as the data for controlling the SLM. The second step includes a first transform step, a second transform step, and a third transform step. In the first transform step, a first waveform function in a frequency domain including an intensity spectrum function and a phase spectrum function is transformed into a second waveform function in a temporal domain including a temporal intensity waveform function and a temporal phase waveform function. In the second transform step, a third waveform function in the temporal domain that includes a temporal intensity waveform function and a temporal phase waveform function and corresponds to a target intensity spectrogram generated in advance is calculated from the second waveform function. In the third transform step, the third waveform function is transformed into a fourth waveform function in the frequency domain including an intensity spectrum function and a phase spectrum function. In the second step, the first transform step, the second transform step, and the third transform step are repeatedly performed for each of the plurality of pieces of preliminary data while replacing the first waveform function with the fourth waveform function. At this time, in the first transform step at the beginning of repeated operations, each of the plurality of initial phase spectrum functions is set as the phase spectrum function of the first waveform function. In addition, each of the plurality of pieces of preliminary data is generated based on the phase spectrum function of the fourth waveform function obtained after the repeated operations.

A form of data generation device is a device for generating data for controlling an SLM. The data generation device includes a storage unit, a preliminary data generation unit, and a data selection unit. The storage unit stores a plurality of initial phase spectrum functions. The preliminary data generation unit generates each of a plurality of pieces of preliminary data for controlling the SLM by using each of the plurality of initial phase spectrum functions. The data selection unit selects at least one of the plurality of pieces of preliminary data and sets the at least one piece of preliminary data as the data for controlling the SLM. The preliminary data generation unit includes a first transform unit, a second transform unit, and a third transform unit. The first transform unit transforms a first waveform function in a frequency domain including an intensity spectrum function and a phase spectrum function into a second waveform function in a temporal domain including a temporal intensity waveform function and a temporal phase waveform function. The second transform unit calculates, from the second waveform function, a third waveform function in the temporal domain that includes a temporal intensity waveform function and a temporal phase waveform function and corresponds to a target intensity spectrogram generated in advance. The third transform unit transforms the third waveform function into a fourth waveform function in the frequency domain including an intensity spectrum function and a phase spectrum function. The preliminary data generation unit repeatedly performs operations of the first transform unit, the second transform unit, and the third transform unit for each of the plurality of pieces of preliminary data while replacing the first waveform function with the fourth waveform function. At this time, the preliminary data generation unit sets each of the plurality of initial phase spectrum functions as the phase spectrum function of the first waveform function in the first transform unit at the beginning of repeated operations. The preliminary data generation unit generates each of the plurality of pieces of preliminary data based on the phase spectrum function of the fourth waveform function obtained after the repeated operations.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION

Figure 1:
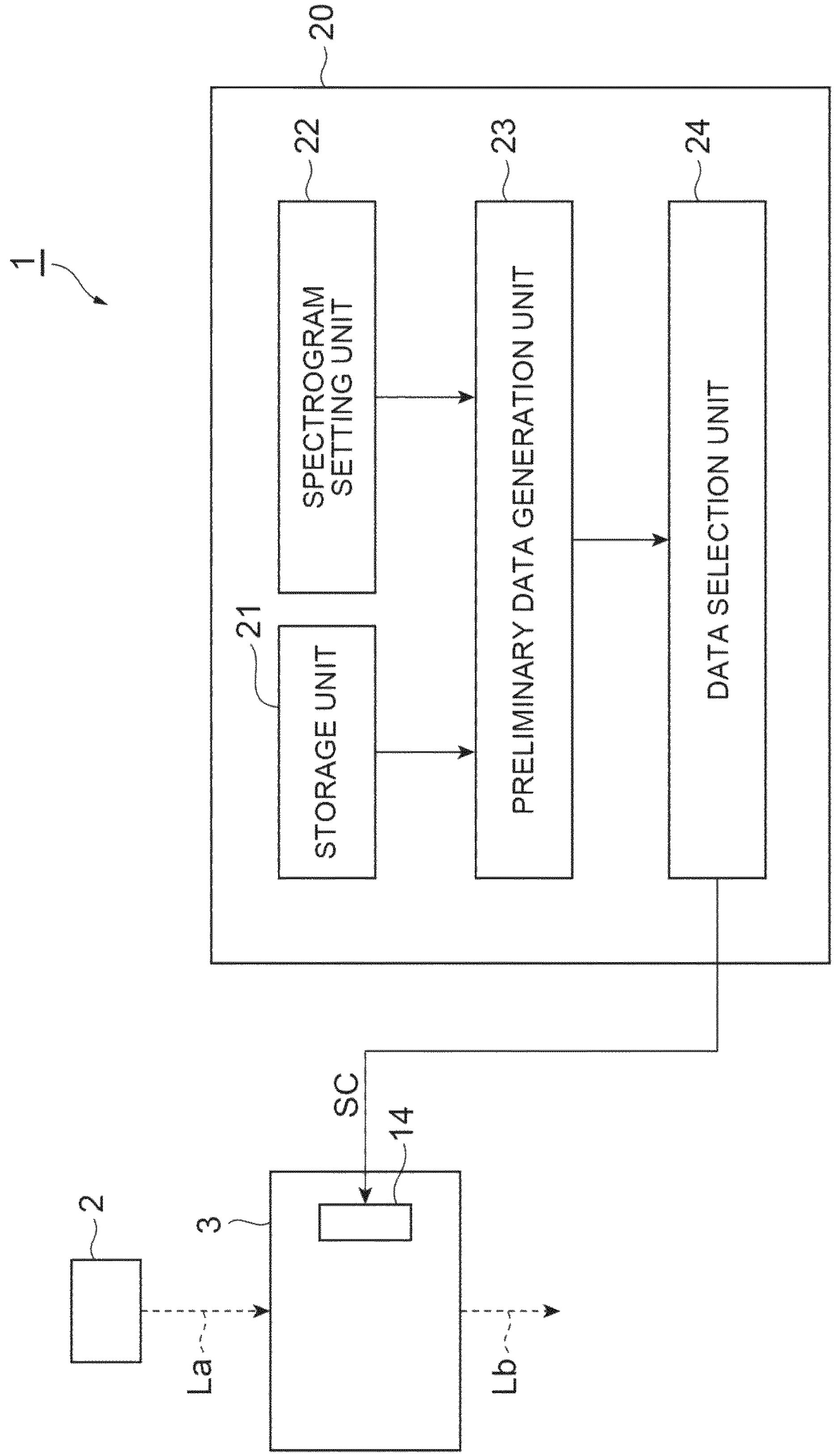
FIG. 1 is a diagram schematically showing the configuration of a light control device according to an embodiment of the present disclosure.

Hereinafter, embodiments will be described in detail with reference to the accompanying diagrams. The present invention is not limited to the embodiments described below. The technical scope of the present invention is determined based on the claims. In the description of the diagrams, the same elements are denoted by the same reference numerals, and the repeated description thereof will be omitted.

FIG. 1 is a diagram schematically showing the configuration of a light control device 1 according to an embodiment of the present disclosure. The light control device 1 according to the present embodiment generates, from input light La, output light Lb having any temporal intensity waveform different from that of the input light La. As shown in FIG. 1, the light control device 1 includes a light source 2, an optical waveform control unit 3, and a data generation device 20.

The light source 2 outputs the input light La that is input to the optical waveform control unit 3. The input light La is, for example, continuous light. Alternatively, the light source 2 is, for example, a laser light source such as a solid-state laser light source, and the input light La (initial optical pulse) is, for example, a single coherent optical pulse. The light source 2 is, for example, a femtosecond laser. In one example, the light source 2 is an LD direct excitation type Yb:YAG pulsed laser. The temporal waveform of an optical pulse is, for example, a Gaussian function. The full width at half maximum (FWHM) of the optical pulse is, for example, in the range of 10 fs to 10000 fs. As an example, the full width at half maximum (FWHM) of the optical pulse is 100 fs. The input light La has a predetermined bandwidth, and includes a plurality of continuous wavelength components. In a practical example, the bandwidth of the input light La is 10 nm and the center wavelength of the input light La is 800 nm.

The optical waveform control unit 3 includes a spatial light modulator (SLM) 14, and receives a control signal SC from the data generation device 20 to the SLM 14. The optical waveform control unit 3 converts the input light La from the light source 2 into the output light Lb having any temporal intensity waveform. The control signal SC is generated based on data for controlling the SLM 14, that is, data including the intensity of the complex amplitude distribution or the intensity of the phase distribution. The phase pattern is, for example, computer-generated holograms (CGH).

Figure 2:
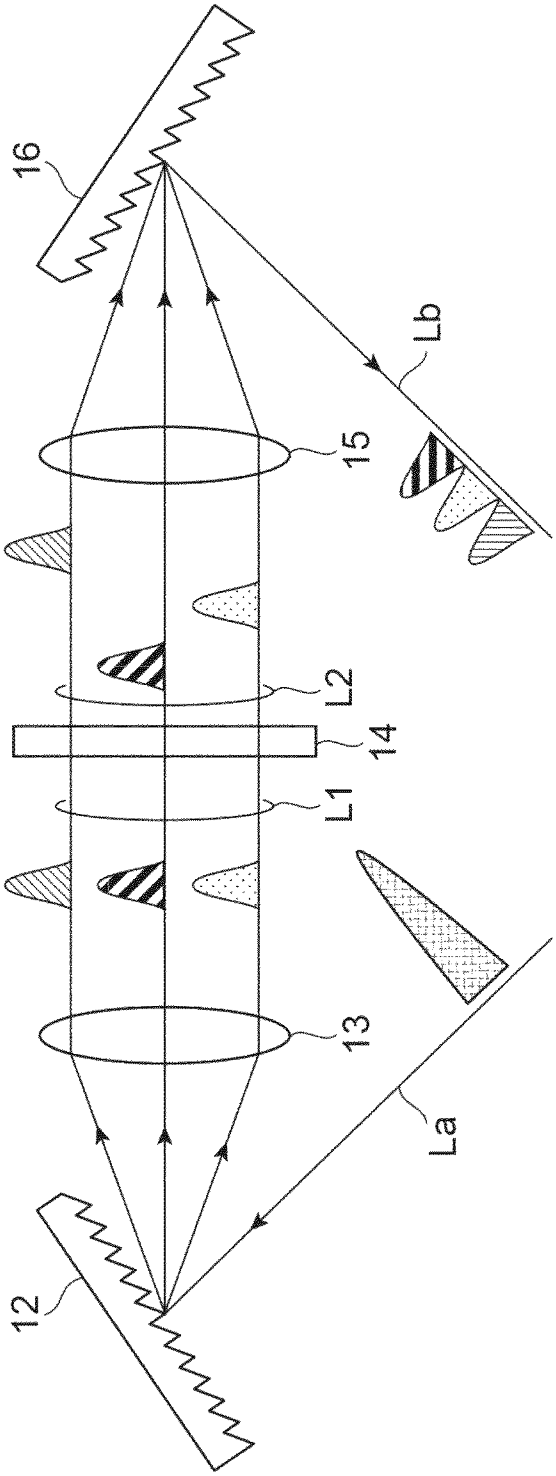
FIG. 2 is a diagram showing an example of the configuration of an optical waveform control unit.

FIG. 2 is a diagram showing an example of the configuration of the optical waveform control unit 3. The optical waveform control unit 3 includes a diffraction grating 12, a lens 13, an SLM 14, a lens 15, and a diffraction grating 16. The diffraction grating 12 is a spectral element in the present embodiment, and is optically coupled to the light source 2. The SLM 14 is optically coupled to the diffraction grating 12 through the lens 13. The diffraction grating 12 spatially separates a plurality of wavelength components included in the input light La for each wavelength. In addition, as spectral elements, other optical components such as a prism may be used instead of the diffraction grating 12.

The input light La is obliquely incident on the diffraction grating 12 to be split into a plurality of wavelength components. Light L1 including a plurality of wavelength components is condensed for each wavelength component by the lens 13, so that the image is formed on the modulation surface of the SLM 14. The lens 13 may be a convex lens formed of a light transmissive member, or may be a concave mirror having a concave light reflecting surface.

The SLM 14 shifts the phases of the plurality of wavelength components output from the diffraction grating 12 from each other, in order to convert the input light La into the output light Lb. For that, the SLM 14 receives the control signal SC from the data generation device 20 and simultaneously performs phase modulation and intensity modulation of the light L1. In addition, the SLM 14 may perform only the phase modulation or only the intensity modulation. The SLM 14 is of a phase modulation type, for example. In a practical example, the SLM 14 is of an LCOS (Liquid Crystal on Silicon) type. In addition, although the transmissive SLM 14 is shown in the diagram, the SLM 14 may be of a reflective type. In addition, the SLM 14 is not limited to the phase modulation type spatial light modulator, and may be an intensity modulation type spatial light modulator, such as a DMD (Digital Micro Mirror Device), or a phase-intensity modulation type spatial light modulator.

Figure 3:
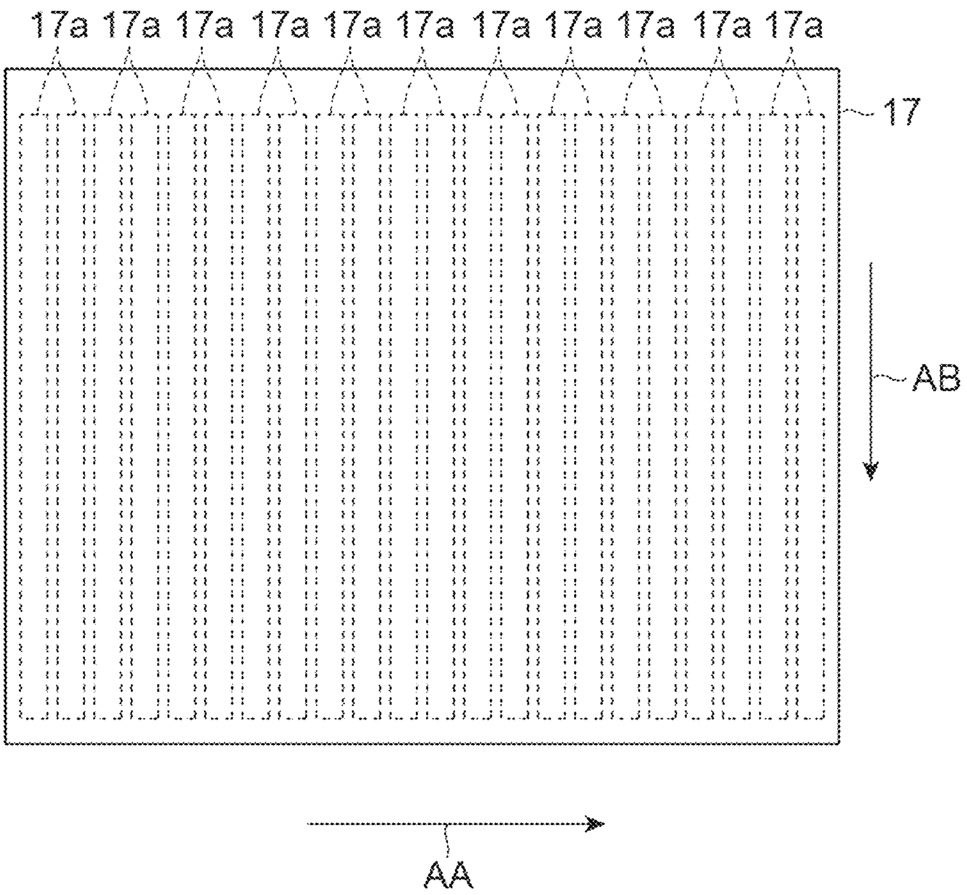
FIG. 3 is a diagram showing the modulation surface of a spatial light modulator.

FIG. 3 is a diagram showing a modulation surface 17 of the SLM 14. As shown in FIG. 3, on the modulation surface 17, a plurality of modulation regions 17*a* are aligned along a predetermined direction AA, and each modulation region 17*a* extends in a direction AB crossing the direction AA. The direction AA is a spectral direction by the diffraction grating 12. The modulation surface 17 functions as a Fourier transform surface, and each corresponding wavelength component after splitting is incident on each of the plurality of modulation regions 17*a*. The SLM 14 modulates the phase and intensity of each incident wavelength component independently from other wavelength components in each modulation region 17*a*. In addition, since the SLM 14 of the present embodiment is of the phase modulation type, the intensity modulation is realized by the phase pattern (phase image) presented on the modulation surface 17.

Each wavelength component of modulated light L2 modulated by the SLM 14 is focused at one point on the diffraction grating 16 by the lens 15. The lens 15 and the diffraction grating 16 function as an optical system for condensing the modulated light L2. The lens 15 may be a convex lens formed of a light transmissive member, or may be a concave mirror having a concave light reflecting surface. In addition, the diffraction grating 16 functions as a multiplexing optical system, and multiplexes the modulated wavelength components. That is, a plurality of wavelength components of the modulated light L2 are condensed and multiplexed by the lens 15 and the diffraction grating 16 to form the output light Lb. When the SLM 14 is of a reflective type, the lens 13 and the lens 15 may be formed by using a common lens, and the diffraction grating 12 and the diffraction grating 16 may be formed by using a common diffraction grating.

Figure 4A:
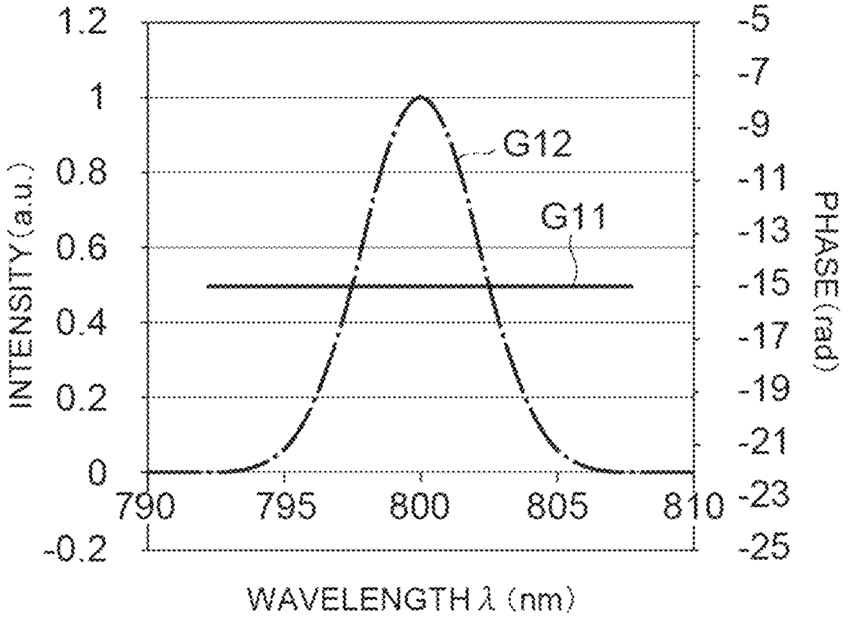
FIG. 4A shows the spectral waveform of single-pulse input light.
Figure 4B:
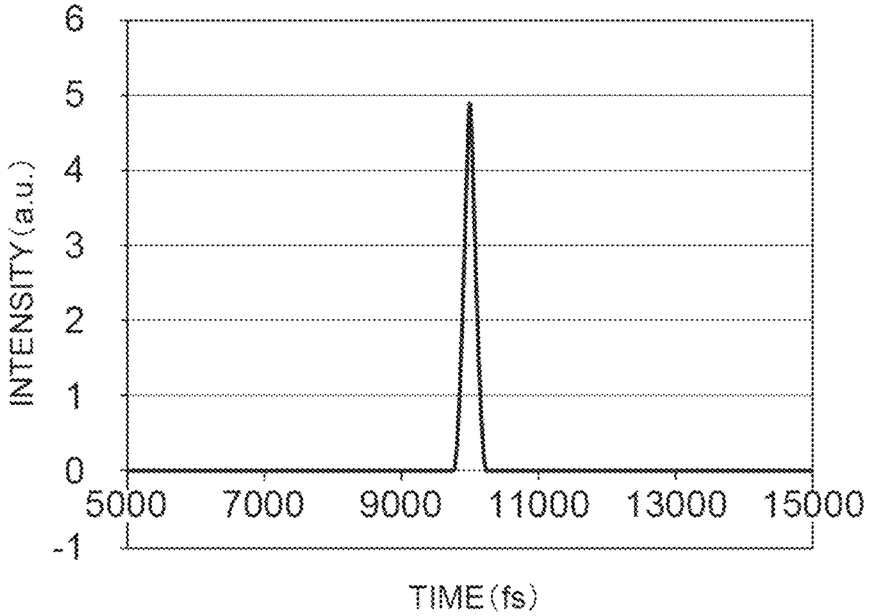
FIG. 4B shows the temporal intensity waveform of the input light.
Figure 5A:
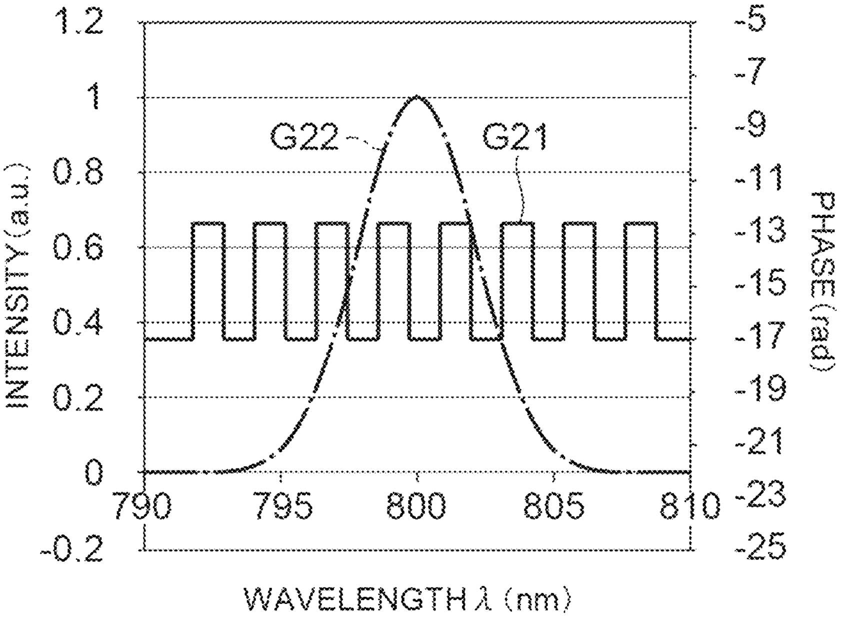
FIG. 5A shows the spectral waveform of output light when rectangular-wave spectral phase modulation is applied in the spatial light modulator.
Figure 5B:
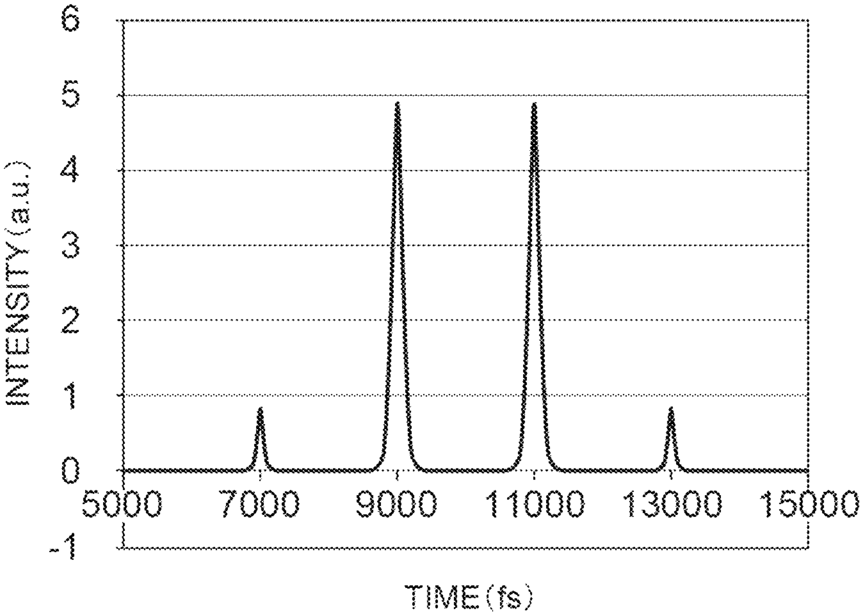
FIG. 5B shows the temporal intensity waveform of the output light.

A region in front of the lens 15 (spectral domain) and a region behind the diffraction grating 16 (temporal domain) have a Fourier transform relationship therebetween, and the phase modulation in the spectral domain affects the temporal intensity waveform in the temporal domain. Therefore, the output light Lb has a desired temporal intensity waveform, which is different from the input light La, according to the modulation pattern of the SLM 14. Here, FIG. 4A shows, as an example, the spectral waveform (spectral phase G11 and spectral intensity G12) of the single-pulse input light La, and FIG. 4B shows the temporal intensity waveform of the input light La. In addition, FIG. 5A shows, as an example, the spectral waveform (spectral phase G21 and spectral intensity G22) of the output light Lb when rectangular-wave spectral phase modulation is applied in the SLM 14, and FIG. 5B shows the temporal intensity waveform of the output light Lb. In FIGS. 4A and 5A, the horizontal axis indicates wavelength (nm), the left vertical axis indicates the intensity value (any unit) of the intensity spectrum, and the right vertical axis indicates the phase value (rad) of the spectral phase. In addition, in FIGS. 4B and 5B, the horizontal axis indicates time (femtoseconds) and the vertical axis indicates light intensity (any unit). In this example, a single pulse of the input light La is converted into a double pulse with higher-order light as the output light Lb by applying a rectangular-wave phase spectrum waveform to the output light Lb. In addition, the spectrum and the waveform shown in FIGS. 5A and 5B are examples, and the temporal intensity waveform of the output light Lb can be shaped into various shapes by combining various spectral phases and spectral intensities.

When the output light Lb is an optical pulse train including a plurality of optical pulses, the optical pulse train may be a group of single pulses generated by using each wavelength band obtained by dividing the spectrum forming the input light La into a plurality of wavelength bands. In this case, there may be portions that overlap each other at the boundaries of the plurality of wavelength bands. Such an optical pulse train is called a "band-controlled burst pulse".

Figures 6A, 6B, 6C:
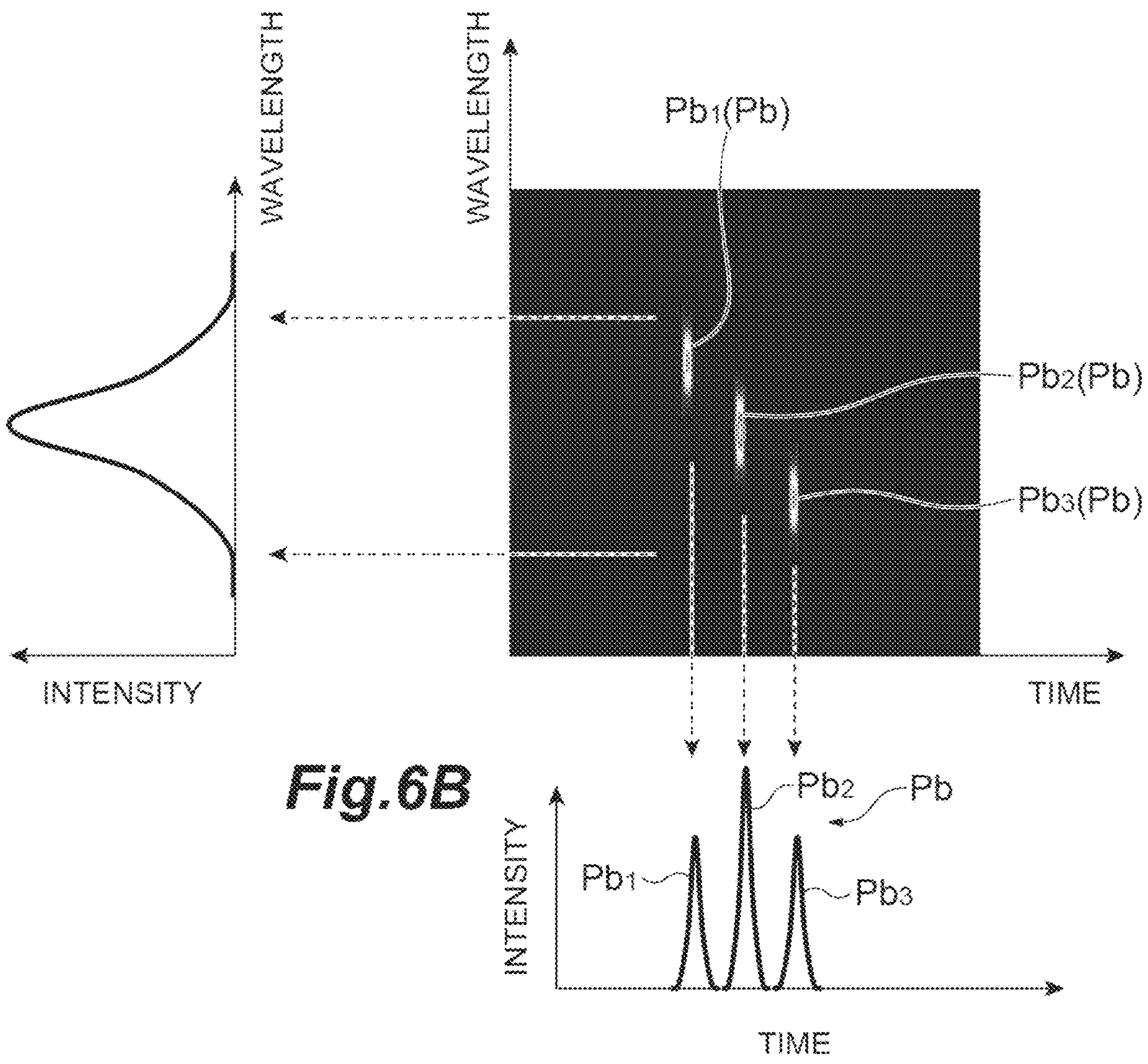
FIGS. 6A, 6B, and 6C are diagrams showing examples of band-controlled burst pulses.

FIGS. 6A to 6C are diagrams showing examples of the band-controlled burst pulse. In this example, an optical pulse train Pb including three optical pulses $Pb_1$ to $Pb_3$ is shown. FIG. 6A is a spectrogram in which the horizontal axis indicates time, the vertical axis indicates wavelength, and the light intensity is expressed by color shading. FIG. 6B shows a temporal waveform of the optical pulse train Pb. The temporal waveform of each of the optical pulses $Pb_1$ to $Pb_3$ is, for example, a Gaussian function.

As shown in FIGS. 6A and 6B, the peaks of the three optical pulses $Pb_1$ to $Pb_3$ are temporally separated from each other, and the propagation timings of the three optical pulses $Pb_1$ to $Pb_3$ are shifted from each other. In other words, for one optical pulse $Pb_1$, another optical pulse $Pb_2$ has a time delay, and for another optical pulse $Pb_2$, still another optical pulse $Pb_3$ has a time delay. However, the bottom portions of the adjacent optical pulses $Pb_1$ and $Pb_2$ (or $Pb_2$ and $Pb_3$) may overlap each other. The time interval (peak interval) between the adjacent optical pulses $Pb_1$ and $Pb_2$ (or $Pb_2$ and $Pb_3$) is, for example, in the range of 10 fs to 10000 fs. As an example, the time interval (peak interval) between the adjacent optical pulses $Pb_1$ and $Pb_2$ (or $Pb_2$ and $Pb_3$) is 2000 fs. In addition, the FWHM of each of the optical pulses $Pb_1$ to $Pb_3$ is, for example, in the range of 10 fs to 5000 fs. As an example, the FWHM of each of the optical pulses $Pb_1$ to $Pb_3$ is 300 fs.

FIG. 6C shows a spectrum obtained by combining the three optical pulses $Pb_1$ to $Pb_3$. As shown in FIG. 6C, the spectrum obtained by combining the three optical pulses $Pb_1$ to $Pb_3$ has a single peak. However, referring to FIG. 6A, the center wavelengths of the three optical pulses $Pb_1$ to $Pb_3$ are shifted from each other. The spectrum having a single peak shown in FIG. 6C is almost the same as the spectrum of the input light La.

The peak wavelength interval between the adjacent optical pulses $Pb_1$ and $Pb_2$ (or $Pb_2$ and $Pb_3$) is determined by the spectral bandwidth of the input light La, and is in the range of approximately twice the full width at half maximum. For example, when the spectral bandwidth of the input light La is 10 nm, the peak wavelength interval is 5 nm. As a specific example, when the center wavelength of the input light La is 800 nm, the peak wavelengths of the three optical pulses $Pb_1$ to $Pb_3$ can be 795 nm, 800 nm, and 805 nm, respectively.

Figure 7C:
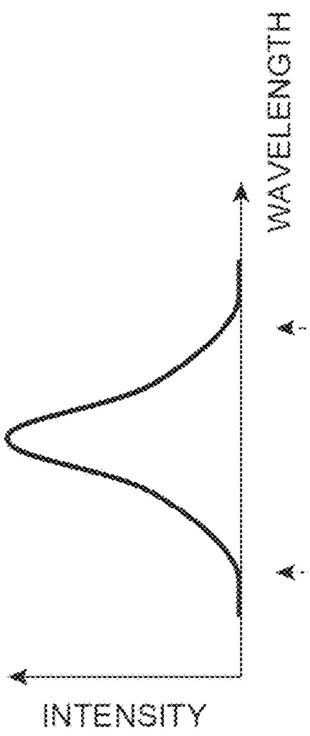
FIGS. 7A, 7B, and 7C are diagrams showing examples of burst pulses that are not band-controlled.
Figure 7A:
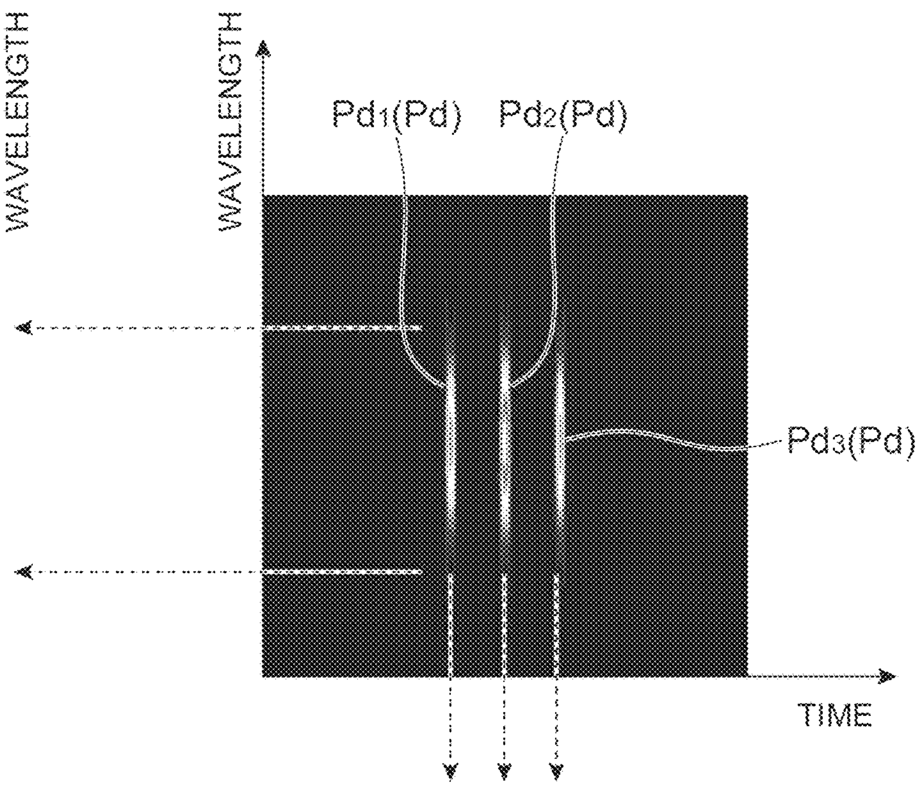
Figure 7B:
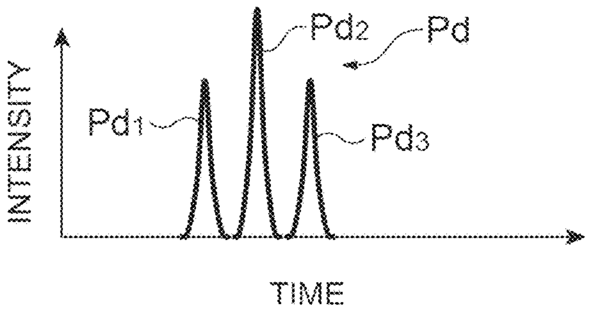

FIGS. 7A to 7C are diagrams showing examples of burst pulses that are not band-controlled. In this example, an optical pulse train Pd including three optical pulses $Pd_1$ to $Pd_3$ is shown. Similarly to FIG. 6A, FIG. 7A is a spectrogram in which the horizontal axis indicates time, the vertical axis indicates wavelength, and the light intensity is expressed by color shading. FIG. 7B shows a temporal waveform of the optical pulse train Pd. FIG. 7C shows a spectrum obtained by combining the three optical pulses $Pd_1$ to $Pd_3$.

As shown in FIGS. 7A to 7C, the peaks of the three optical pulses $Pd_1$ to $Pd_3$ are temporally separated from each other, but the center wavelengths of the three optical pulses $Pd_1$ to $Pd_3$ match each other. The optical waveform control unit 3 of the present embodiment can also generate the optical pulse train Pb shown in FIGS. 6A to 6C, in which the center wavelengths of the optical pulses $Pb_1$ to $Pb_3$ are different, without being limited to such an optical pulse train Pd.

FIG. 1 is referred to again. The data generation device 20 is communicably connected to the SLM 14, and generates data regarding a phase modulation pattern for approximating the temporal intensity waveform of the output light Lb to a desired waveform and provides the control signal SC including the data to the SLM 14. The data generation device 20 of the present embodiment presents to the SLM 14 a phase pattern for phase modulation for applying a spectral phase and a spectral intensity to obtain the desired waveform to the output light Lb. For this purpose, the data generation device 20 includes a storage unit 21, a spectrogram setting unit 22, a preliminary data generation unit 23, and a data selection unit 24.

In addition, the data generation device 20 may be provided separately from the device that provides the control signal SC to the SLM 14. In this case, the data generation device 20 provides data regarding the phase modulation pattern to the device that provides the control signal SC to the SLM 14. The data generation device 20 may be, for example, a personal computer, a smart device such as a smartphone or a tablet terminal, or a computer having a processor such as a cloud server.

Figure 8:
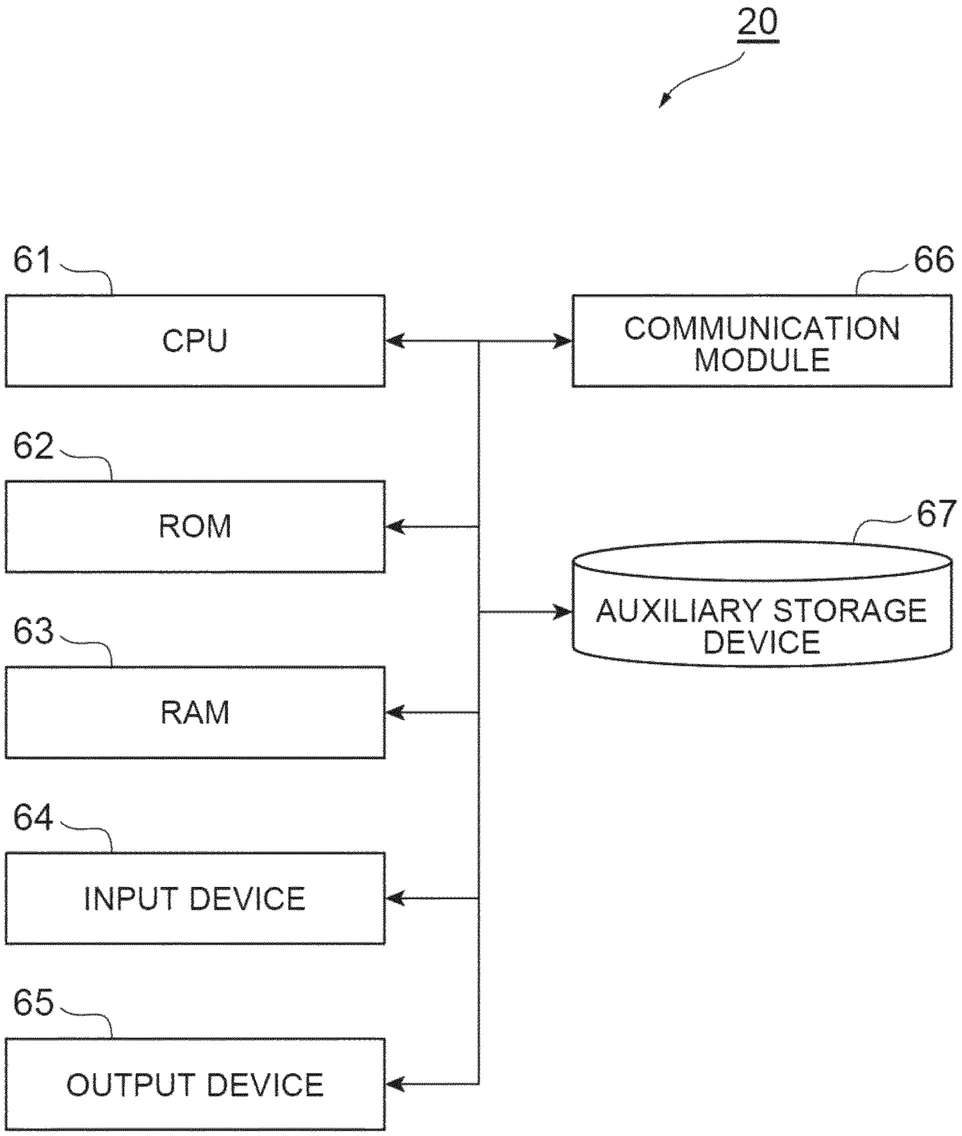
FIG. 8 is a diagram schematically showing an example of the hardware configuration of a data generation device.

FIG. 8 is a diagram schematically showing an example of the hardware configuration of the data generation device 20. As shown in FIG. 8, the data generation device 20 can physically be a normal computer including: a processor (CPU) 61; a main storage device such as a ROM 62 and a RAM 63; an input device 64 such as a keyboard, a mouse, and a touch screen; an output device 65 such as a display (including a touch screen); a communication module 66 such as a network card for transmitting and receiving data to and from other devices; and an auxiliary storage device 67 such as a hard disk.

The processor 61 of the computer can realize each function of the data generation device 20 by using a data generation program. Therefore, the data generation program causes the processor 61 of the computer to operate as the spectrogram setting unit 22, the preliminary data generation unit 23, and the data selection unit 24 in the data generation device 20. The data generation program is stored in a storage device (storage medium) inside or outside the computer. The storage device may be a non-transitory recording medium. Examples of recording media include a recording medium such as a flexible disk, a CD, or a DVD, a recording medium such as a ROM, a semiconductor memory, and a cloud server. The ROM 62 or the auxiliary storage device 67 forms the storage unit 21.

The storage unit 21 stores a plurality of initial phase spectrum functions that are used when generating data regarding a phase modulation pattern for approximating the temporal intensity waveform of the output light Lb to the desired waveform. The initial phase spectrum function will be detailed later.

The spectrogram setting unit 22 generates a target intensity spectrogram. Data regarding the target intensity spectrogram is provided to the preliminary data generation unit 23. The preliminary data generation unit 23 calculates a plurality of phase spectrum functions suitable for realizing the provided target intensity spectrogram by using each of the plurality of initial phase spectrum functions stored in the storage unit 21. Then, the preliminary data generation unit 23 calculates each of a plurality of phase modulation patterns (for example, computer-generated holograms), which are to be applied to the output light Lb in the optical waveform control unit 3, based on each of the plurality of phase spectrum functions and generates a plurality of pieces of preliminary data capable of controlling the SLM 14 for each of the phase modulation patterns.

The data selection unit 24 selects at least one of the plurality of pieces of preliminary data generated by the preliminary data generation unit 23, and determines the preliminary data as data for controlling the SLM 14. Then, the control signal SC including the determined data is provided to the SLM 14. The SLM 14 is controlled based on the control signal SC. In the data selection unit 24, data may be selected by the operator's operation, or data may be automatically selected according to predetermined rules.

Figure 9:
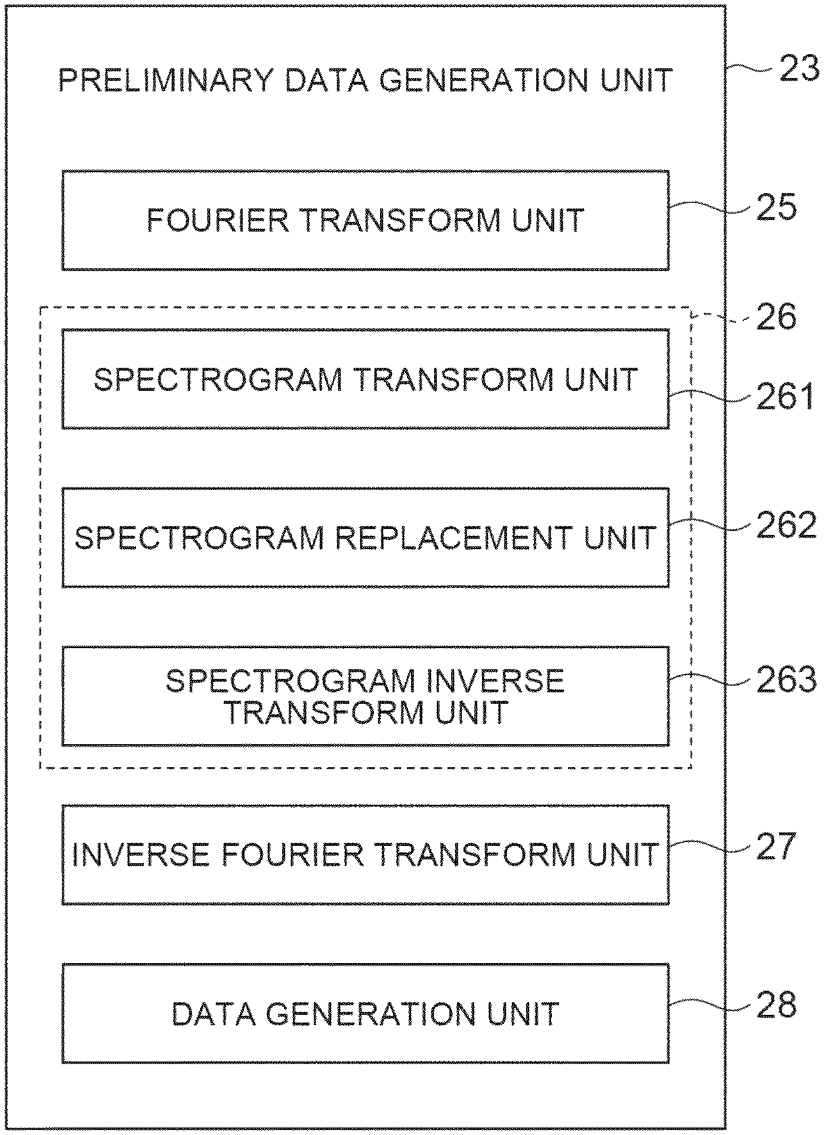
FIG. 9 is a block diagram showing the internal configuration of a preliminary data generation unit.
Figure 10:
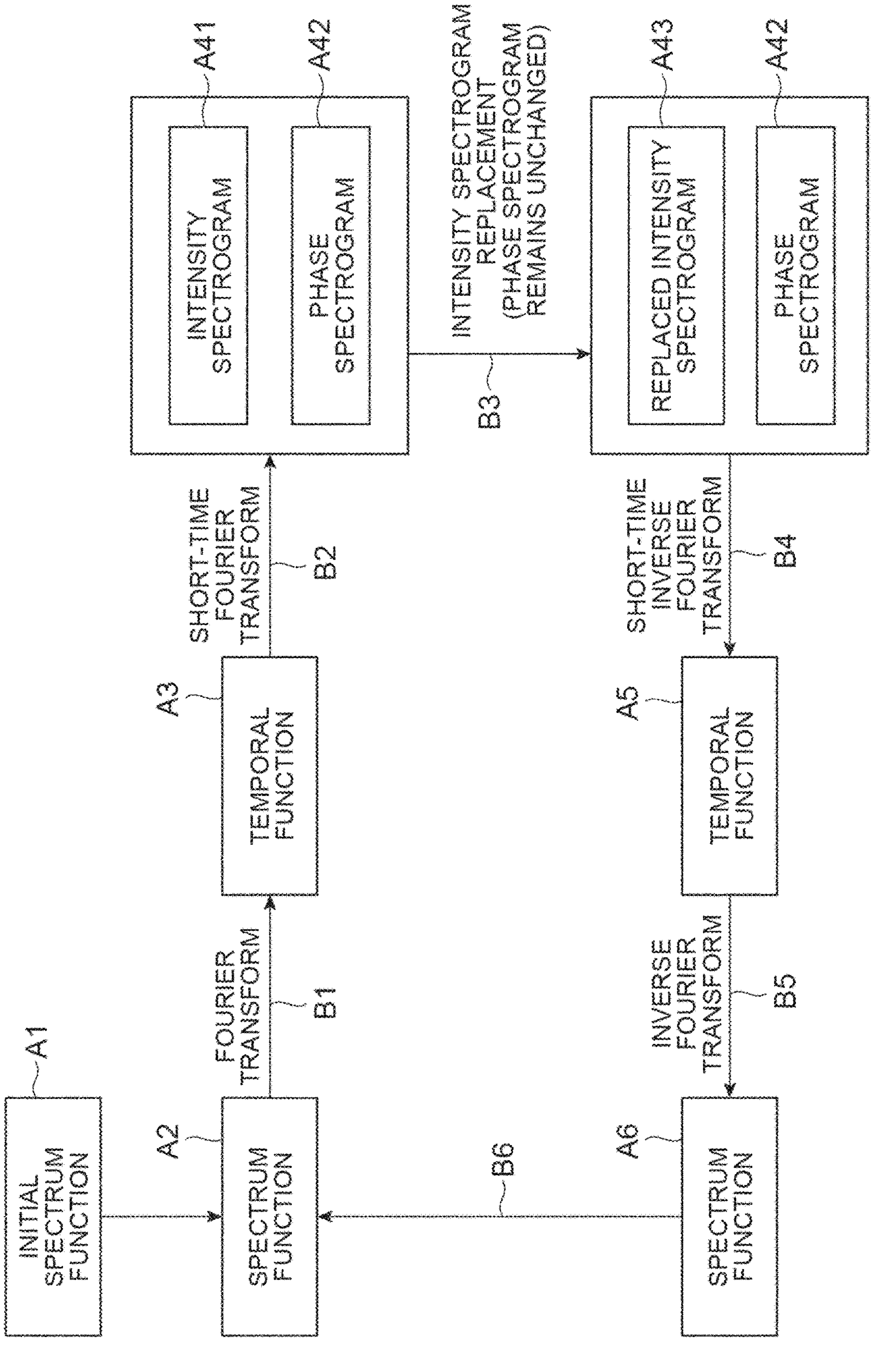
FIG. 10 is a block diagram showing a procedure for calculating a phase spectrum function in the preliminary data generation unit.
Figure 11:
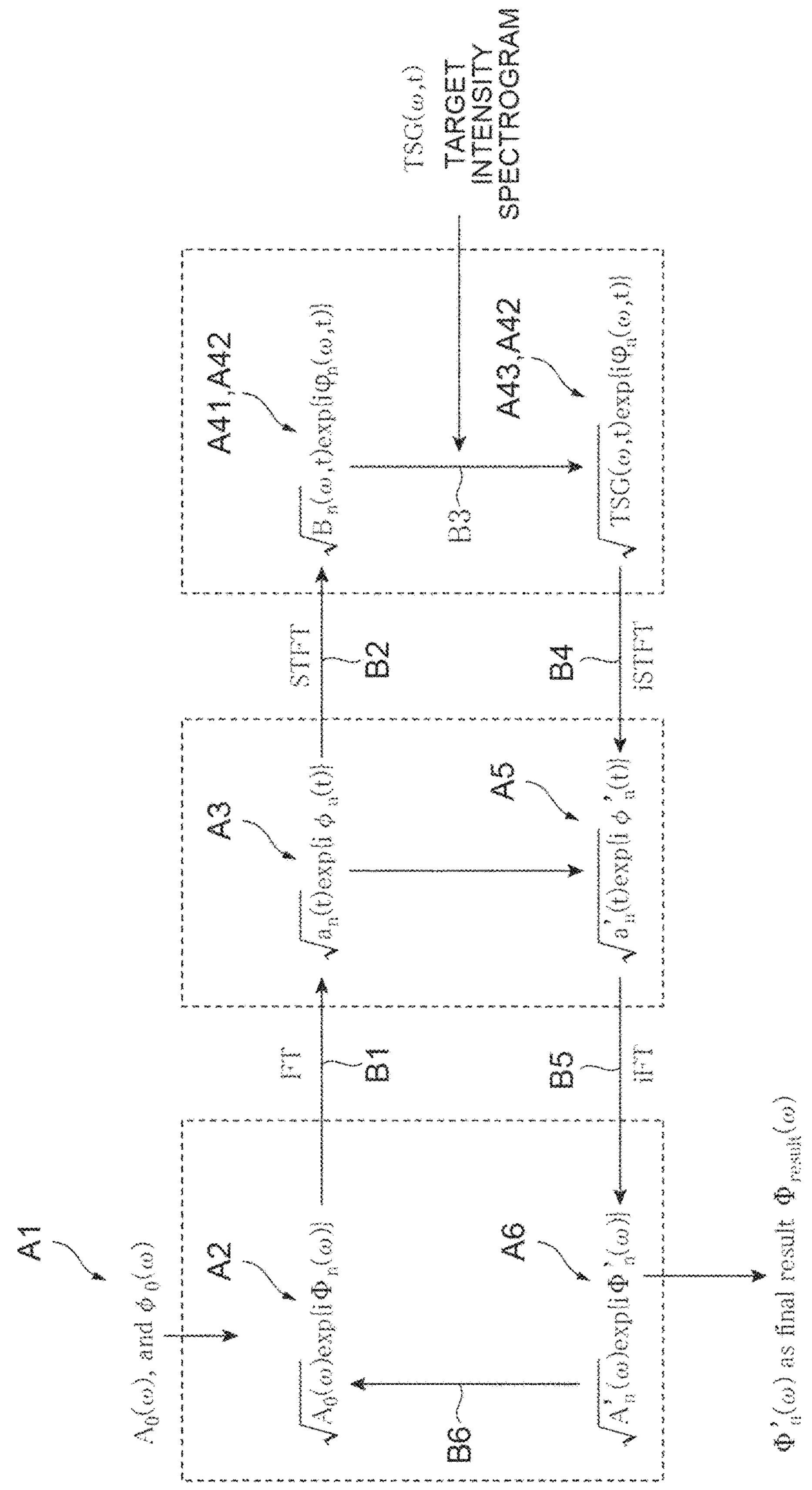
FIG. 11 is a diagram showing a procedure, by using mathematical expressions, for calculating a phase spectrum function in the preliminary data generation unit.

FIG. 9 is a block diagram showing the internal configuration of the preliminary data generation unit 23. As shown in FIG. 9, the preliminary data generation unit 23 includes a Fourier transform unit 25 (first transform unit), a function transform unit 26 (second transform unit), an inverse Fourier transform unit 27 (third transform unit), and a data generation unit 28. The function transform unit 26 includes a spectrogram transform unit 261, a spectrogram replacement unit 262, and a spectrogram inverse transform unit 263. The preliminary data generation unit 23 calculates a phase spectrum function, which is the basis of the modulation pattern, by using a calculation method described below. FIG. 10 is a block diagram showing the calculation procedure of the phase spectrum function in the preliminary data generation unit 23. FIG. 11 is a diagram showing a procedure, by using mathematical expressions, for calculating the phase spectrum function in the preliminary data generation unit 23.

First, an initial spectrum function A1, that is, an initial intensity ωspectrum function $A_0(\omega)$ and an initial phase spectrum function $\Phi_0(\omega)$, which are functions of the frequency ω, are prepared. As an example, the initial intensity spectrum function $A_0(\omega)$ indicates the intensity spectrum of the input light La, but is not limited thereto. In addition, the initial phase spectrum function $\Phi_0(\omega)$ is sequentially selected from a plurality of initial phase spectrum functions $\Phi_0(\omega)$ store in the storage unit 21. The plurality of initial phase spectrum functions $\Phi_0(\omega)$ may be automatically generated by using random numbers, for example. The number of initial phase spectrum functions $\Phi_0(\omega)$ is, or example, 100 or more. The data generation device 20 may further include a unit that generates the plurality of initial phase spectrum functions $\Phi_0(\omega)$, that is, an initial phase spectrum function generation unit. In addition, a large number of initial phase spectrum functions $\Phi_0(\omega)$ may be stored in advance in the storage unit 21, and the operator may select some of the initial phase spectrum functions $\Phi_0(\omega)$. In this case, the initial phase spectrum functions $\Phi_0(\omega)$ stored in the storage unit 21 may be recorded so as to be grouped according to various conditions such as the parameters (center wavelength, bandwidth, spectral shape, spectral phase, and the like) of the input light La and the parameters (the number of pulses, time interval between pulses, the center wavelength of each pulse, the bandwidth of each pulse, peak intensity ratio between pulses, and the like) of the target optical pulse train Pb. In this case, the operator can select a group of initial phase spectrum functions $\Phi_0(\omega)$ suitable for the desired optical pulse train Pb.

Figure 12A:
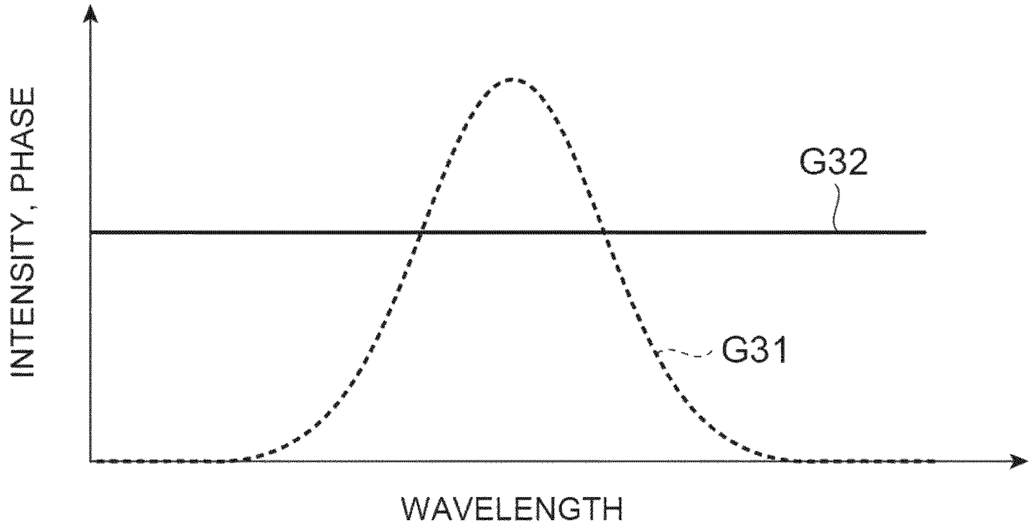
FIG. 12A is a graph schematically showing an initial intensity spectrum function and an initial phase spectrum function as an example of an initial spectrum function.

FIG. 12A is a graph schematically showing the initial intensity spectrum function $A_0(\omega)$ and the initial phase spectrum function $\Phi_0(\omega)$ as an example of the initial spectrum function A1. In FIG. 12A, a graph G31 shows the intensity spectrum function $A_0(\omega)$, and a graph G32 shows the phase spectrum function $\Phi_0(\omega)$. The horizontal axis indicates wavelength, and the vertical axis indicates the intensity value of the intensity spectrum function or the phase value of the phase spectrum function.

A first waveform function A2 is expressed by the following Formula (1). Here, n is a repetition number (n=1, 2, . . . , N), and i is an imaginary number. In the first cycle (n=1), the initial spectrum function A1 is set as the first waveform function A2. That is, setting is made to satisfy $\Phi_0(\omega)=\Phi_0(\omega)$ of the first waveform function A2 in the first cycle of repetition.

[Formula 1]

$$\sqrt{A_0((\omega))}\exp\{i\Phi_n(\omega)\} \tag{1}$$

The Fourier transform unit 25 of the preliminary data generation unit 23 performs Fourier transform from the frequency domain to the temporal domain on the first waveform function A2 (arrow B1 in the diagram, first transform step). As a result, as shown by the following Formula (2), a second waveform function A3 in the temporal domain including a temporal intensity waveform function $a_n(t)$ and a temporal phase waveform function $\phi_n(t)$ is obtained.

[Formula 3]

$$\sqrt{a_n(t)}\exp\{i\phi_n(t)\} \tag{2}$$

Figure 12B:
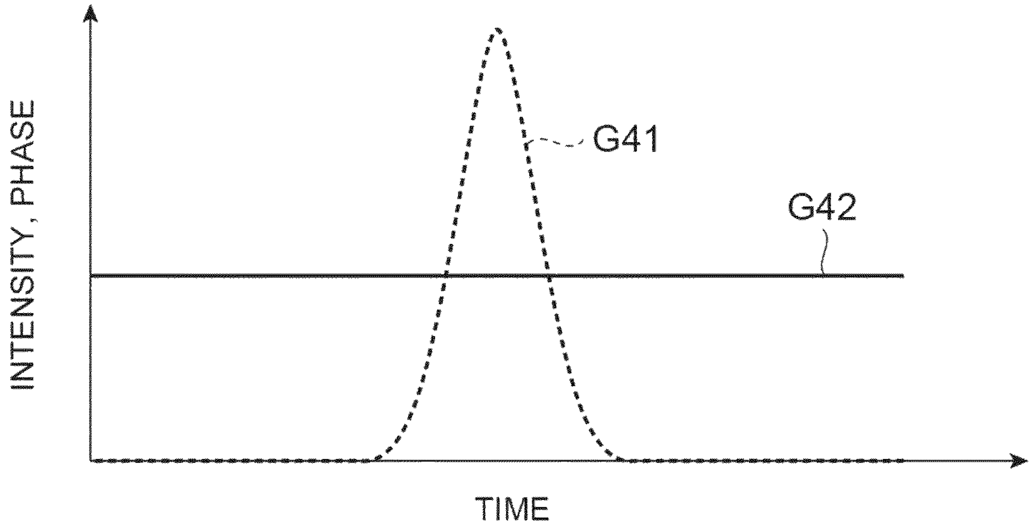
FIG. 12B is a graph schematically showing a temporal intensity waveform function and a temporal phase waveform function of a second waveform function in the first cycle, which has been Fourier-transformed from a first waveform function.

FIG. 12B is a graph schematically showing a temporal intensity waveform function $a_1(t)$ and a temporal phase waveform function $\phi_1(t)$ of the second waveform function A3 in the first cycle, which has been Fourier-transformed from the first waveform function A2 shown in FIG. 12A. In FIG. 12B, a graph G41 shows the temporal intensity waveform function $a_1(t)$, and a graph G42 shows the temporal phase waveform function $\phi_1(t)$. The horizontal axis indicates time, and the vertical axis indicates the intensity value of the temporal intensity waveform function or the phase value of the temporal phase waveform function.

Then, the function transform unit 26 transforms a third waveform function A5 in the temporal domain including a temporal intensity waveform function $a'_n(t)$ and a temporal phase waveform function $\phi'_n(t)$, which corresponds to an intensity spectrogram A43 (target intensity spectrogram) generated in advance, from the second waveform function A3 (second transform step). Hereinafter, a specific operation of the function transform unit 26 will be described.

The spectrogram transform unit 261 of the function transform unit 26 performs a short-time Fourier transform (STFT) on the second waveform function A3 (arrow B2 in the diagram). As a result, an intensity spectrogram A41 and a phase spectrogram A42 shown by the following Formula (3) are obtained.

[Formula 3]

$$\sqrt{B_n(\omega, t)}\exp\{i\varphi_n(\omega, t)\} \tag{3}$$

Figure 13A:
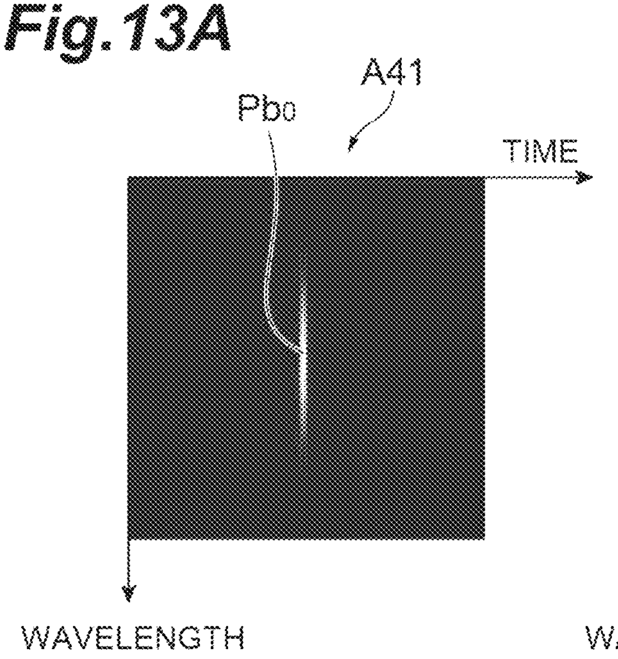
FIG. 13A is a diagram showing an intensity spectrogram transformed from the second waveform function shown in FIG. 12B.
Figure 13B:
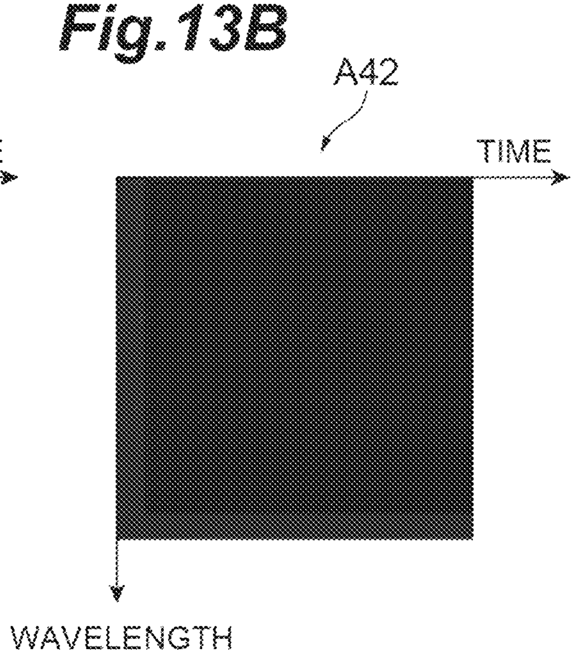
FIG. 13B is a diagram showing a phase spectrogram transformed from the second waveform function shown in FIG. 12B.

FIGS. 13A and 13B are diagrams respectively showing the intensity spectrogram A41 and the phase spectrogram A42 transformed from the second waveform function A3 shown in FIG. 12B. In addition, in FIGS. 13A and 13B, the horizontal axis indicates time and the vertical axis indicates wavelength. In addition, the value of the spectrogram is shown by the brightness of the diagram, and the value of the spectrogram increases as the brightness increases. In this example, a single optical pulse $Pb_0$ appears in the intensity spectrogram A41.

In addition, the processing in the spectrogram transform unit 261 for transforming the second waveform function A3 into the intensity spectrogram A41 and the phase spectrogram A42 is not limited to the STFT, and may be other kinds of processing. The processing for transforming a temporal waveform into a spectrogram is called time-frequency transform, including the STFT. In the time-frequency transform, frequency filter processing or numerical calculation processing (processing for deriving the spectrum for each time by performing multiplication while shifting the window function) is performed on a composite signal, such as a temporal waveform, to generate three-dimensional information including time, frequency, and signal component intensity (intensity spectrum). In the present embodiment, the transform result (time, frequency, and intensity spectrum) is defined as a "spectrogram". Examples of time-frequency transform include wavelet transforms (Haar wavelet transform, Gabor wavelet transform, Mexican Hat wavelet transform, and Morley wavelet transform) in addition to the STFT.

Then, the spectrogram replacement unit 262 of the function transform unit 26 replaces the intensity spectrogram A41 with the intensity spectrogram A43 (target intensity spectrogram) generated in advance, and constrains the phase spectrogram A42 (arrow B3 in the diagram). The intensity spectrogram A43 is provided from the spectrogram setting unit 22 (see FIG. 1). Constraining the phase spectrogram A42 means not changing the phase spectrogram A42 (leaving the phase spectrogram A42 as it is). Therefore, the above Formula (3) is replaced with the following Formula (4). TSG($\omega$, t) is a target intensity spectrogram function.

[Formula 4]

$$\sqrt{TSG(\omega, t)}\exp\{i\varphi_n(\omega, t)\} \tag{4}$$

Figure 13C:
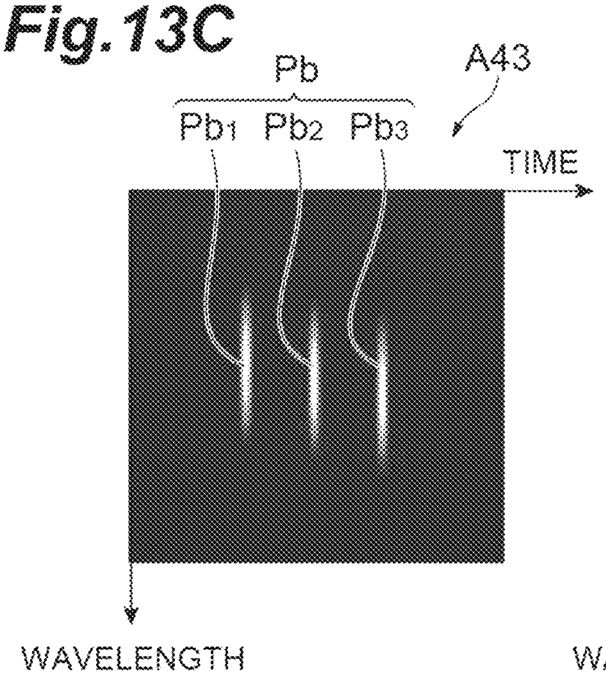
FIG. 13C is a diagram showing an example of a target intensity spectrogram.
Figure 13D:
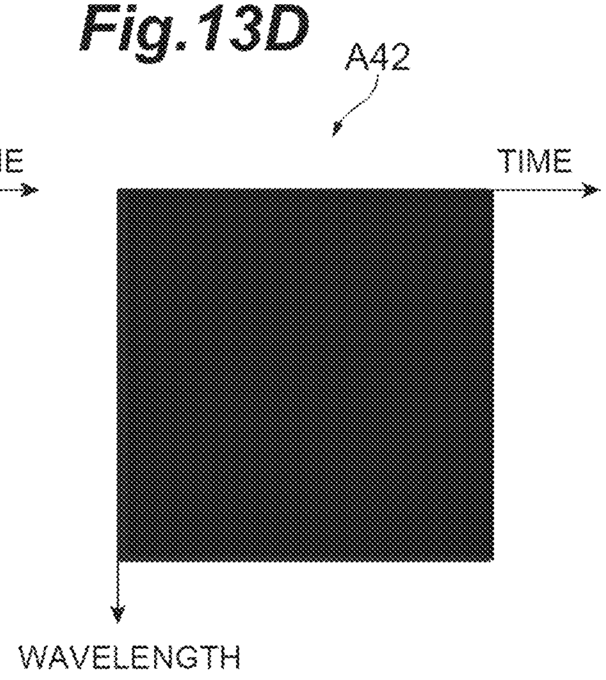
FIG. 13D is a diagram showing a constrained phase spectrogram.

FIG. 13C is a diagram showing an example of the intensity spectrogram A43. FIG. 13D is a diagram showing the constrained phase spectrogram A42. In FIGS. 13C and 13D, the horizontal axis indicates time and the vertical axis indicates wavelength. The value of the spectrogram is shown by the brightness of the diagram, and the value of the spectrogram increases as the brightness increases. In this example, the intensity spectrogram A43 includes the optical pulse train Pb including the three optical pulses $Pb_1$, $Pb_2$, and $Pb_3$ having time differences therebetween and having different center wavelengths from each other. The constrained phase spectrogram A42 is completely the same as in FIG. 13B.

Then, the spectrogram inverse transform unit 263 of the function transform unit 26 performs an inverse STFT on the intensity spectrogram A43 and the phase spectrogram A42 (arrow B4 in the diagram). In addition, similarly to the spectrogram transform unit 261, time-frequency transform other than the STFT may also be used herein. As a result, as shown by the following Formula (5), the third waveform function A5 in the temporal domain including the temporal intensity waveform function $a'_n(t)$ and the temporal phase waveform function $\phi'_n(t)$ is obtained. Here, in the first cycle, n=1.

[Formula 5]

$$\sqrt{a'_n(t)}\exp\{i\phi'_n(t)\} \quad (5)$$

Figure 14A:
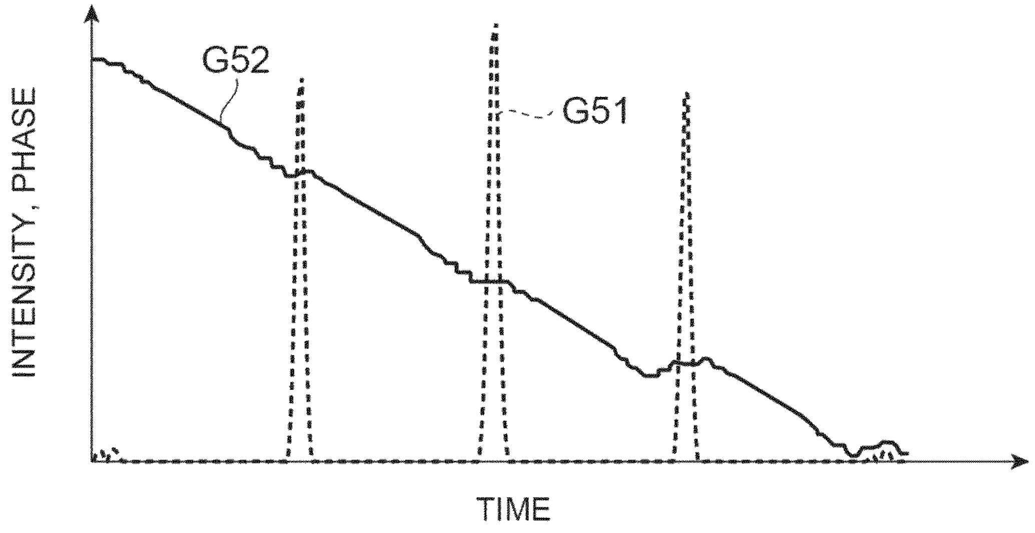
FIG. 14A is a graph schematically showing a temporal intensity waveform function and a temporal phase waveform function of a third waveform function in the first cycle, which has been subjected to inverse STFT from the intensity spectrogram and the phase spectrogram shown in FIGS. 13C and 13D.

FIG. 14A is a graph schematically showing the temporal intensity waveform function $a'_1(t)$ and the temporal phase waveform function $\phi'_1(t)$ of the third waveform function A5 in the first cycle, which has been subjected to inverse STFT from the intensity spectrogram A43 and the phase spectrogram A42 shown in FIGS. 13C and 13D. In FIG. 14A, a graph G51 shows the temporal intensity waveform function $a'_1(t)$, and a graph G52 shows the temporal phase waveform function $\phi_1(t)$. The horizontal axis indicates time, and the vertical axis indicates the intensity value of the temporal intensity waveform function or the phase value of the temporal phase waveform function.

Then, the inverse Fourier transform unit 27 performs an inverse Fourier transform from the temporal domain to the frequency domain on the third waveform function A5 (arrow B5 in the diagram, third transform step). As a result, as shown by the following Formula (6), a fourth waveform function A6 in the frequency domain including an intensity spectrum function $A'_n(\omega)$ and a phase spectrum function $\Phi'_n(\omega)$ is obtained. Here, in the first cycle, n=1.

[Formula 6]

$$\sqrt{A'_n(\omega)}\exp\{i\Phi'_n(\omega)\} \quad (6)$$

Figure 14B:
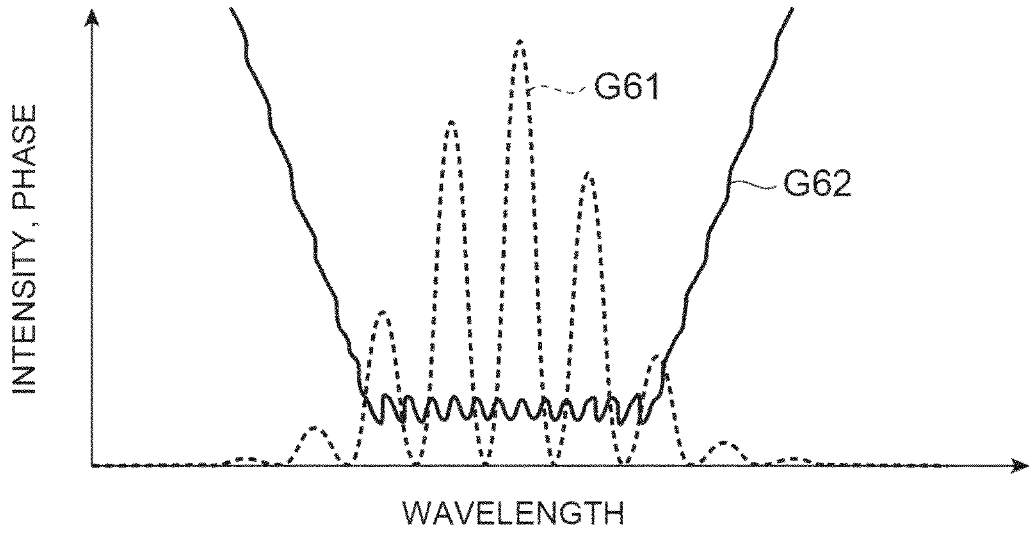
FIG. 14B is a graph schematically showing an intensity spectrum function and a phase spectrum function of a fourth waveform function in the first cycle, which has been subjected to inverse Fourier transform from the third waveform function shown in FIG. 14A.

FIG. 14B is a graph schematically showing the intensity spectrum function $A'_1(\omega)$ and the phase spectrum function $\Phi'_1(\omega)$ of the fourth waveform function A6 in the first cycle, which has been subjected to inverse Fourier transform from the third waveform function A5 shown in FIG. 14A. In FIG. 14B, a graph G61 shows the intensity spectrum function $A'_1(\omega)$, and a graph G62 shows the phase spectrum function $\Phi_1(\omega)$. The horizontal axis indicates wavelength, and the vertical axis indicates the intensity value of the intensity spectrum function or the phase value of the phase spectrum function.

Thereafter, the preliminary data generation unit 23 replaces the phase spectrum function $\Phi_1(\omega)$ of the first waveform function A2 with the phase spectrum function $\Phi'_1(\omega)$ of the fourth waveform function while constraining the intensity spectrum function $A_0(\omega)$ of the first waveform function A2 (that is, setting is made to satisfy $\Phi_2(\omega)=\Phi'_1(\omega)$ of the first waveform function A2. See the arrow B6 in the diagram). Then, the operations of the Fourier transform unit 25, the spectrogram transform unit 261, the spectrogram replacement unit 262, the spectrogram inverse transform unit 263, and the inverse Fourier transform unit 27 described above are repeated N times until the evaluation value indicating the degree of match between the intensity spectrogram A41 and the target intensity spectrogram A43 converges. Thus, in the preliminary data generation unit 23, the Fourier transform unit 25, the spectrogram transform unit 261, the spectrogram replacement unit 262, the spectrogram inverse transform unit 263, and the inverse Fourier transform unit 27 repeatedly operate in this order while constraining the intensity spectrum function $A_0(\omega)$ of the first waveform function A2 and replacing the phase spectrum function $\Phi_{n+1}(\omega)$ of the first waveform function A2 in the (n+1)-th cycle with the phase spectrum function $\Phi'_n(\omega)$ of the fourth waveform function in the n-th cycle.

Figure 15A:
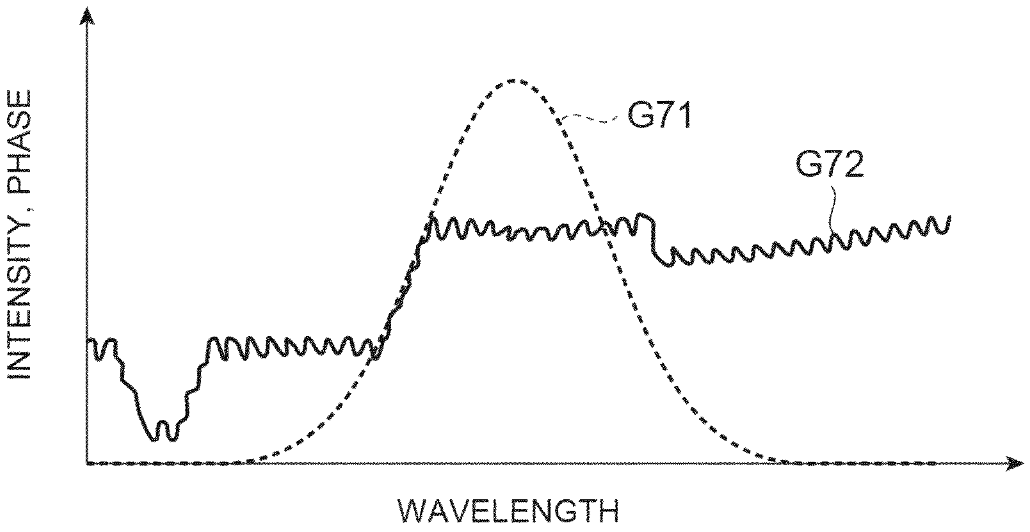
FIG. 15A is a graph schematically showing the intensity spectrum function and the phase spectrum function of the first waveform function in the third cycle (n=3) after FIG. 14B.
Figure 15B:
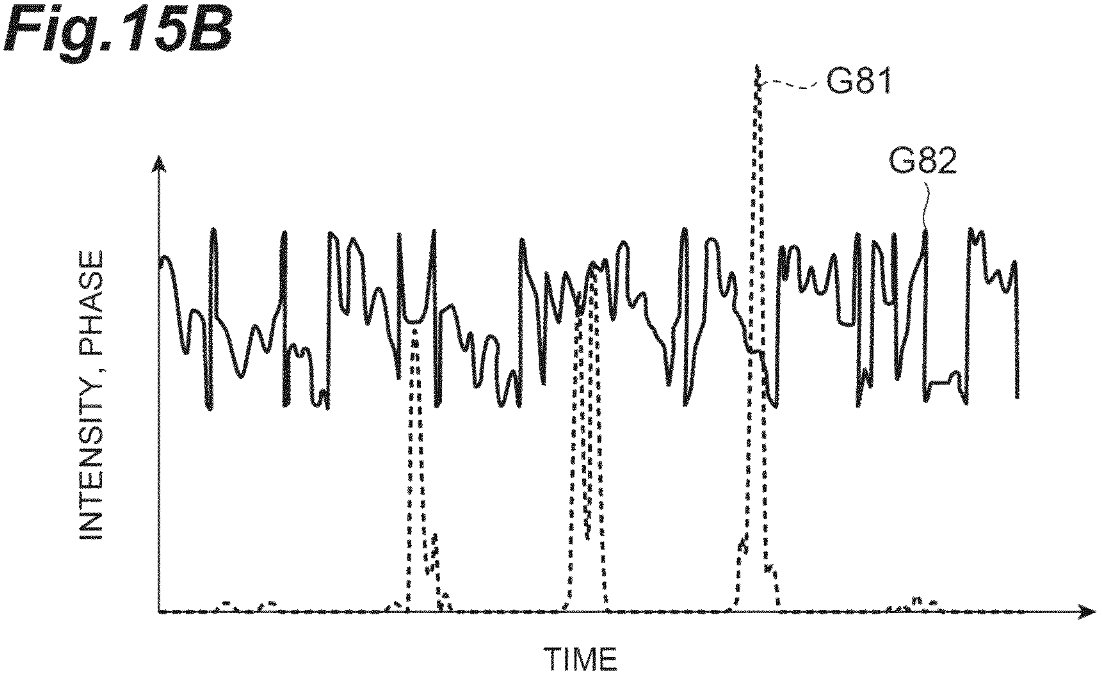
FIG. 15B is a graph schematically showing the temporal intensity waveform function and the temporal phase waveform function of the second waveform function in the third cycle, which has been Fourier-transformed from the first waveform function shown in FIG. 15A.
Figure 16A:
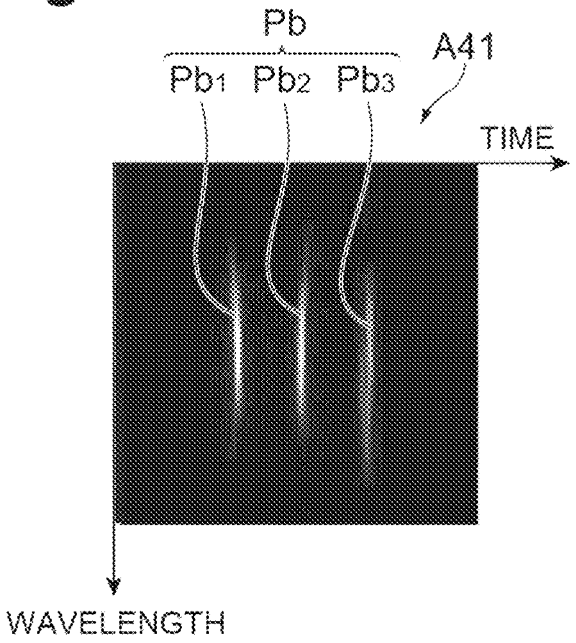
FIGS. 16A and 16B are diagrams respectively showing an intensity spectrogram and a phase spectrogram in the third cycle transformed from the second waveform function shown in FIG. 15B.
Figure 16B:
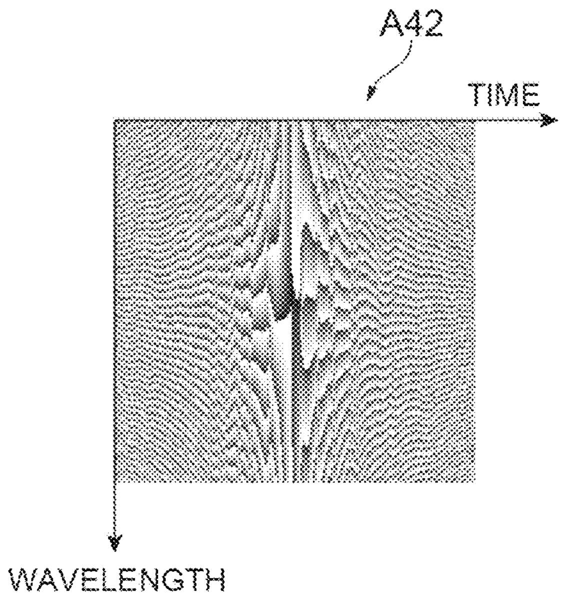
Figure 16C:
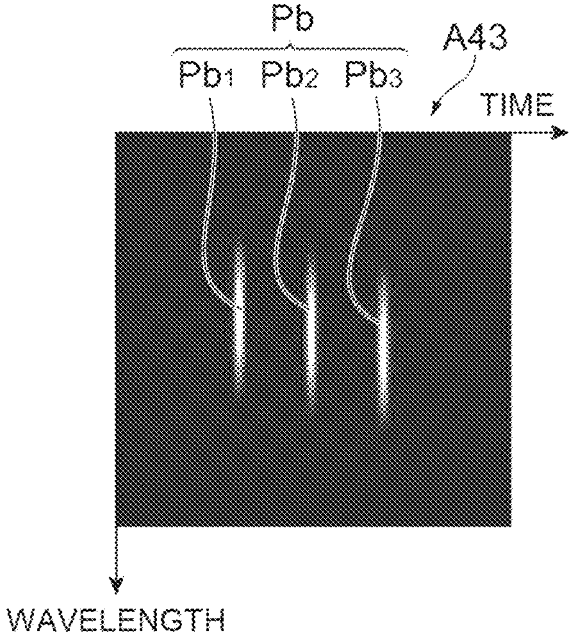
FIG. 16C is a diagram showing an intensity spectrogram in the third cycle.
Figure 16D:
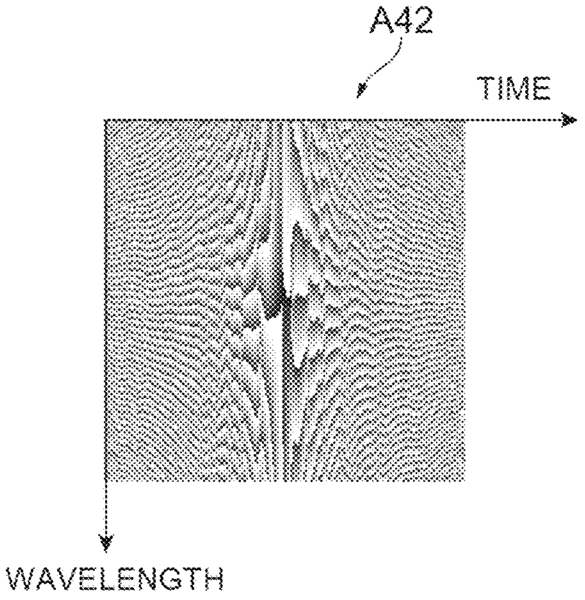
FIG. 16D is a diagram showing a constrained phase spectrogram in the third cycle.
Figure 17A:
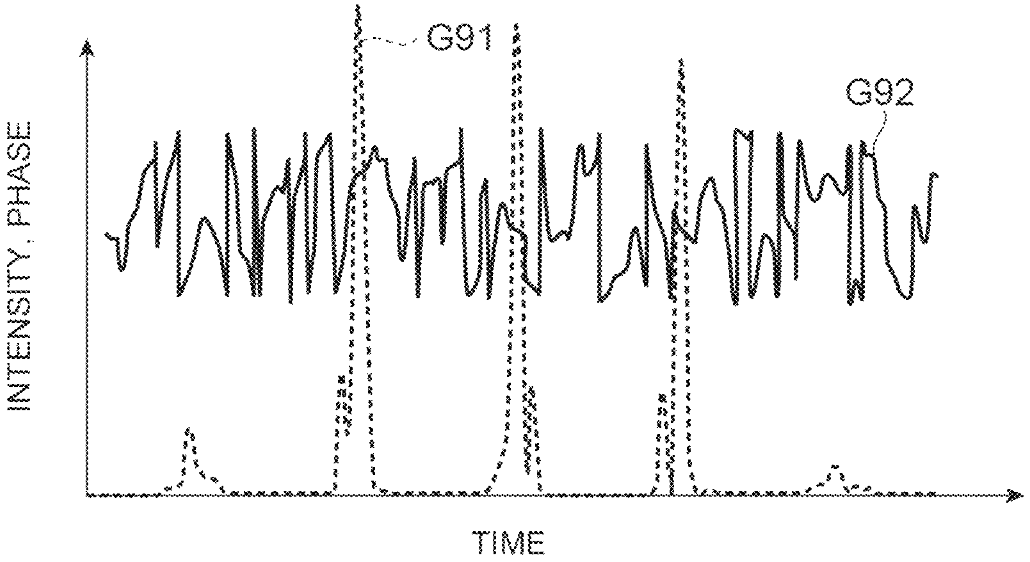
FIG. 17A is a graph schematically showing the temporal intensity waveform function and the temporal phase waveform function of the third waveform function in the third cycle, which has been subjected to inverse STFT from the intensity spectrogram and the phase spectrogram shown in FIGS. 16C and 16D.
Figure 17B:
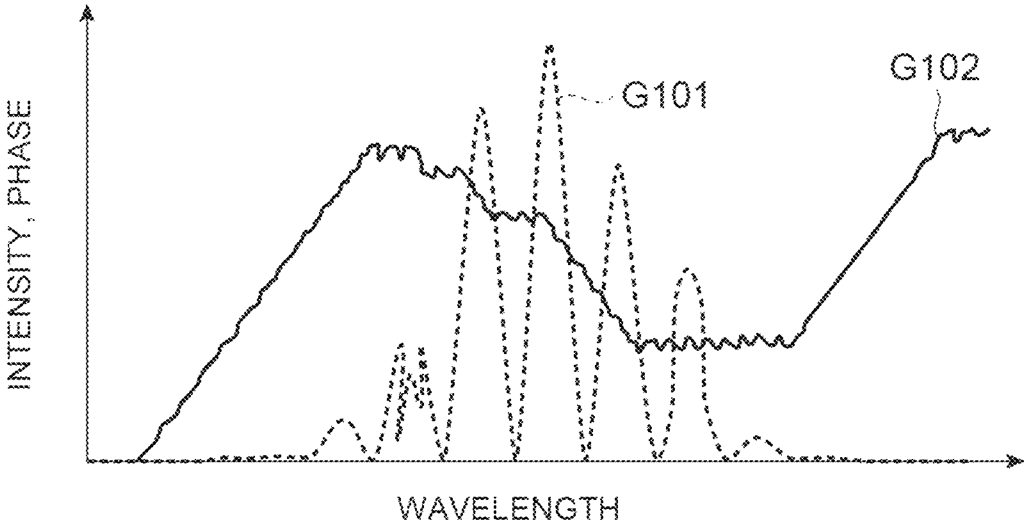
FIG. 17B is a graph schematically showing the intensity spectrum function and the phase spectrum function of the fourth waveform function in the third cycle, which has been subjected to inverse Fourier transform from the third waveform function shown in FIG. 17A.

FIG. 15A is a graph schematically showing the intensity spectrum function $A_0(\omega)$ (graph G71) and the phase spectrum function $\phi_3(\omega)$ (graph G72) of the first waveform function A2 in the third cycle (n=3) after FIG. 14B. It can be seen that the waveform of the phase spectrum function $\Phi_3(\omega)$ has changed from the first cycle. FIG. 15B is a graph schematically showing the temporal intensity waveform function $a_3(t)$ (graph G81) and the temporal phase waveform function $\Phi_3(t)$ (graph G82) of the second waveform function A3 in the third cycle, which has been Fourier-transformed from the first waveform function A2 shown in FIG. 15A. FIGS. 16A and 16B are diagrams respectively showing the intensity spectrogram A41 and the phase spectrogram A42 in the third cycle transformed from the second waveform function A3 shown in FIG. 15B. It can be seen that the three optical pulses $Pb_1$ to $Pb_3$ having time differences therebetween and having different center wavelengths start to be generated. FIG. 16C is a diagram showing the intensity spectrogram A43 in the third cycle, which is the same as the intensity spectrogram A43 in the first cycle shown in FIG. 13C. FIG. 16D is a diagram showing the constrained phase spectrogram A42 in the third cycle, which is the same as the phase spectrogram A42 in FIG. 16B. FIG. 17A is a graph schematically showing the temporal intensity waveform function $a'_3(t)$ (graph G91) and the temporal phase waveform function $\phi'_3(t)$ (graph G92) of the third waveform function A5 in the third cycle, which has been subjected to inverse STFT from the intensity spectrogram A43 and the phase spectrogram A42 shown in FIGS. 16C and 16D. FIG. 17B is a graph schematically showing the intensity spectrum function $A'_3(\omega)$ (graph G101) and the phase spectrum function $\Phi'_3(\omega)$ (graph G102) of the fourth waveform function A6 in the third cycle, which has been subjected to inverse Fourier transform from the third waveform function A5 shown in FIG. 17A.

By the repeated operations described above, the phase spectrum function $\Phi'_n(\omega)$ is modified so that the intensity spectrogram A41 gradually approaches the intensity spectrogram A43. Finally, the phase spectrum function $\Phi'_n(\omega)$ included in the fourth waveform function A6 becomes a desired spectral phase solution $\Phi_{result}(\omega)$. This spectral phase solution $\Phi_{result}(\omega)$ is provided to the data generation unit 28.

The data generation unit 28 calculates preliminary data regarding a phase modulation pattern (for example, a computer-generated hologram) for applying to the output light Lb the spectral phase and/or the spectral intensity based on the spectral phase solution $\Phi_{result}(\omega)$ calculated by the preliminary data generation unit 23.

The preliminary data generation unit 23 performs the above-described repeated calculations and preliminary data calculation for each of the plurality of initial phase spectrum functions $\Phi_0(\omega)$ stored m the storage unit 21. The preliminary data generation unit 23 may perform the repeated calculations and the preliminary data calculation sequentially for each initial phase spectrum function $\Phi_0(\omega)$, or may perform the repeated calculations and the preliminary data calculation in parallel for the plurality of initial phase spectrum functions $\Phi_0(\omega)$.

The plurality of calculated preliminary data may be recorded so as to be grouped for each parameter (center wavelength difference, variation in peak intensity, and the like) of the optical pulse train Pb generated by these. In this case, the operator can easily select data suitable for the desired optical pulse train Pb through the data selection unit 24.

Figure 18:
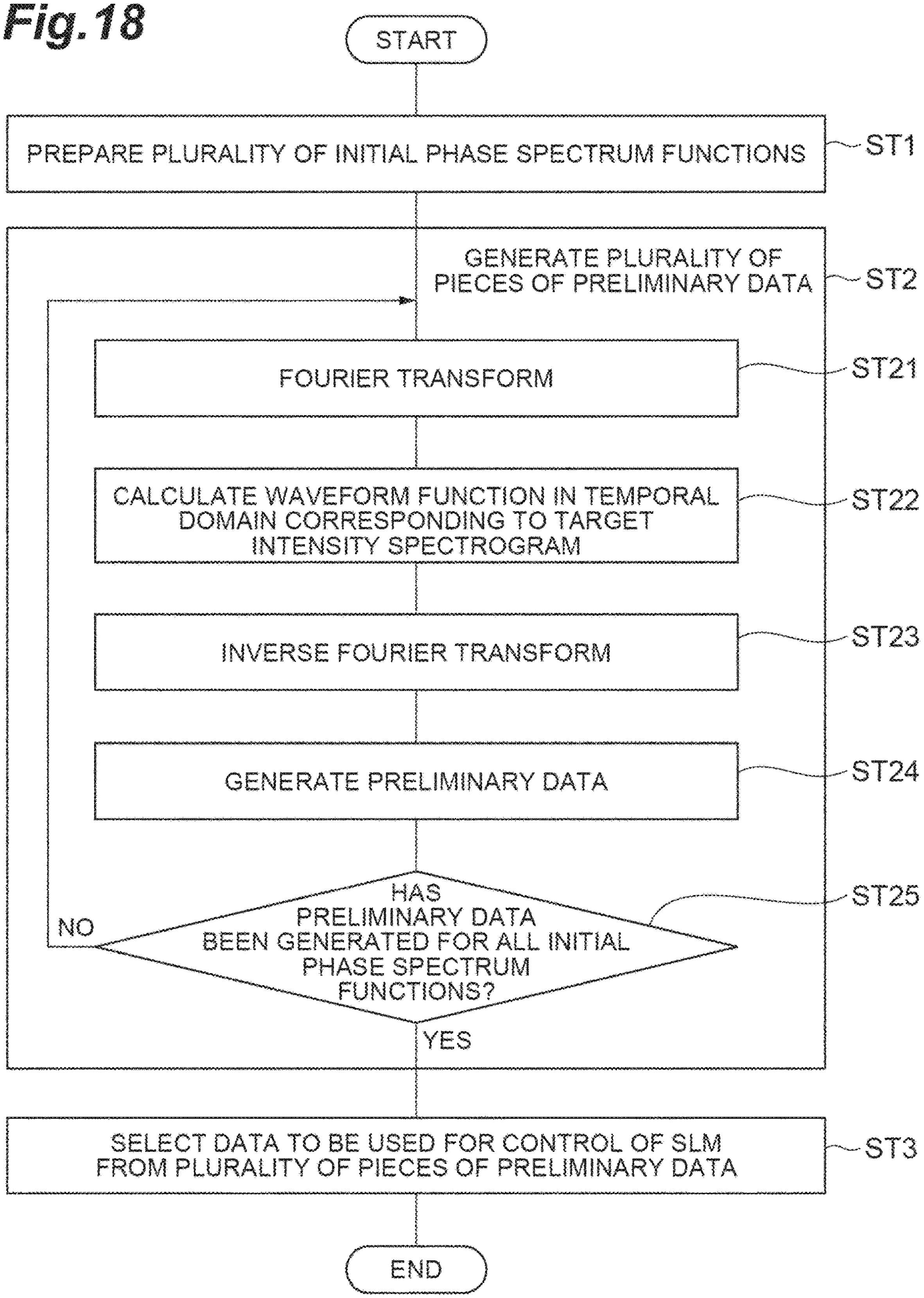
FIG. 18 is a flowchart showing a data generation method according to an embodiment.

FIG. 18 is a flowchart showing a data generation method according to the present embodiment. This data generation method is a method for generating data for controlling the SLM 14, and is appropriately realized by using the data generation device 20 described above. In addition, the data generation program according to the present embodiment is a program for causing a computer to execute each step of the data generation method.

As shown in FIG. 18, first, a plurality of initial phase spectrum functions $\Phi_0(\omega)$ are prepared (first step ST1). As described above, the plurality of initial phase spectrum functions $\Phi_0(\omega)$ may be generated using random numbers. The plurality of prepared initial phase spectrum functions $\Phi_0(\omega)$ are stored in the storage unit 21.

Then, the preliminary data generation unit 23 generates each of a plurality of pieces of preliminary data capable of controlling the SLM 14 by using each of the plurality of initial phase spectrum functions $\Phi_0(\omega)$ (second step ST2). The second step ST2 includes a first transform step ST21, a second transform step ST22, a third transform step ST23, and a data generation step ST24. In the first transform step ST21, the Fourier transform unit 25 transforms the first waveform function A2 in the frequency domain including the intensity spectrum function $A_0(\omega)$ and the phase spectrum function $\Phi_n(\omega)$ into the second waveform function A3 in the temporal domain including the temporal intensity waveform function $a_n(t)$ and the temporal phase waveform function $\phi_n(t)$. In the second transform step ST22, the function transform unit 26 calculates the third waveform function A5 in the temporal domain, which includes the temporal intensity waveform function $a'_n(t)$ and the temporal phase waveform function $\phi_n(t)$ and corresponds to the target intensity spectrogram A43 generated in advance, from the second waveform function A3. The details of the second transform step ST22 are the same as the operation of the function transform unit 26 described above. In the third transform step ST23, the inverse Fourier transform unit 27 transforms the third waveform function A5 into the fourth waveform function A6 in the frequency domain including the intensity spectral function $A'_n(\omega)$ and the phase spectral function $\Phi'_n(\omega)$. In the second step ST2, the first transform step ST21, the second transform step ST22, and the third transform step ST23 are repeatedly performed while replacing the first waveform function A2 with the fourth waveform function A6. In addition, in the first transform step ST21 at the beginning of the repeated operations, one of the plurality of initial phase spectral functions $A_0(\omega)$ is set as the phase spectral function of the first waveform function A2. Then, in the data generation step ST24, the data generation unit 28 generates preliminary data based on the phase spectral function $\Phi'_n(\omega)$ of the fourth waveform function A6 obtained after the repeated operations. In the second step ST2, the above-described repeated calculations are performed for all of the plurality of initial phase spectral functions $A_0(\omega)$, and in the data generation step ST24, preliminary data is generated (step ST25). In this manner, a plurality of pieces of preliminary data respectively corresponding to the plurality of initial phase spectral functions $A_0(\omega)$ are obtained.

Thereafter, the data selection unit 24 selects at least one of the plurality of pieces of preliminary data and sets the selected amount as data for controlling the SLM 14 (third step ST3).

The effects obtained by the data generation device 20, the data generation method, and the data generation program of the present embodiment described above will be described. In general, in order to calculate the modulation pattern to be presented to the SLM 14, one initial phase spectrum function $\Phi_0(\omega)$ is first prepared, and the phase spectrum function $\Phi_n(\omega)$ is gradually approximated to the value that can realize the target temporal intensity waveform and wavelength components through repeated calculations. However, the finally obtained phase spectrum function $\Phi_{result}(\omega)$ differs depending on the initial phase spectrum function $\Phi_0(\omega)$. As a result, when the modulation pattern based on the phase spectrum function $\Phi_{result}(\omega)$ is presented to the SLM 14, the temporal intensity waveform and wavelength components of the obtained light also differ depending on the initial phase spectrum function $\Phi_0(\omega)$. Therefore, in the present embodiment, a plurality of initial phase spectrum functions $\Phi_0(\omega)$ are prepared in advance. Then, in the first transform step ST21 to the third transform step ST23, calculations are repeatedly performed for each initial phase spectrum function $\Phi_0(\omega)$, and among the plurality of pieces of preliminary data obtained, at least a piece of preliminary data is selected as data for controlling the SLM 14. In this manner, it is possible to obtain data including a modulation pattern for accurately realizing light having a desired temporal intensity waveform and wavelength components.

As in the present embodiment, the target intensity spectrogram A43 may be an intensity spectrogram related to the optical pulse train Pb including a plurality of optical pulses $Pb_1$ to $Pb_3$ having different center wavelengths from each other. In this case, it is possible to improve the accuracy of the temporal intensity waveform and wavelength components of the optical pulse train Pb including a plurality of optical pulses $Pb_1$ to $Pb_3$ having different center wavelengths from each other.

As in the present embodiment, the second transform step ST22 may include a step of transforming the second waveform function A3 into the intensity spectrogram A41 and the phase spectrogram A42, a step of replacing the intensity spectrogram A41 with the target intensity spectrogram A43 and constraining the phase spectrogram A42, and a step of transforming the replaced intensity spectrogram A43 and the constrained phase spectrogram A42 into the third waveform function A5. Similarly, the function transform unit 26 may include: a unit that transforms the second waveform function A3 into the intensity spectrogram A41 and the phase spectrogram A42, that is, the spectrogram transform unit 261; a unit that replaces the intensity spectrogram A41 with the target intensity spectrogram A43 and constrains the phase spectrogram A42, that is, the spectrogram replacement unit 262; and a unit that transforms the replaced intensity spectrogram A43 and the constrained phase spectrogram A42 into the third waveform function A5, that is, the spectrogram inverse transform unit 263. For example, with such a configuration, it is possible to obtain a plurality of pieces of preliminary data for accurately realizing light having a desired temporal intensity waveform and wavelength components.

[Generation of a Target Intensity Spectrogram]

Figure 19:
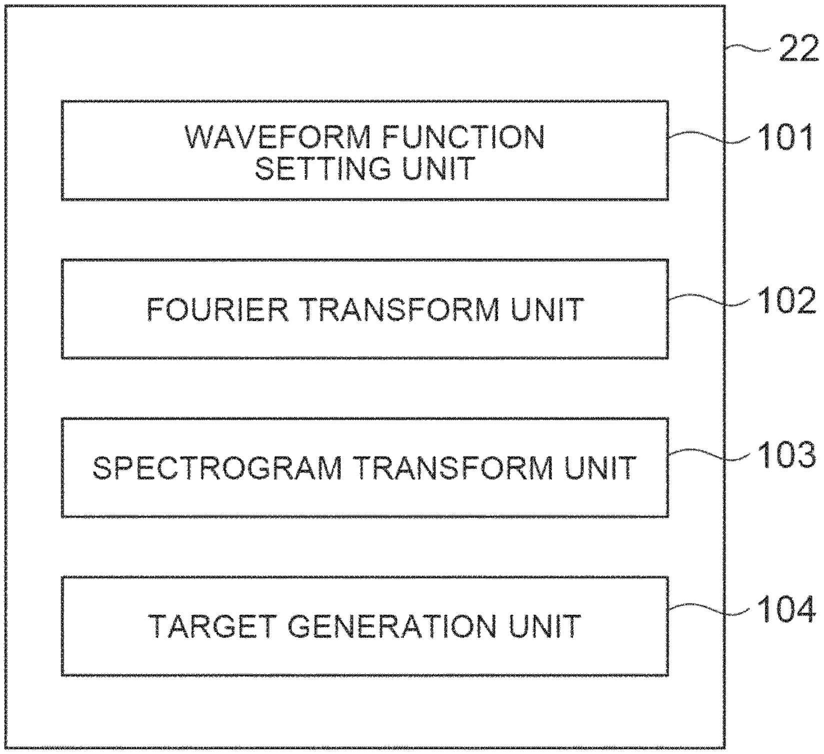
FIG. 19 is a block diagram showing the functional configuration of a spectrogram setting unit.

Next, a procedure for generating the target intensity spectrogram A43 in the spectrogram setting unit 22 will be described. FIG. 19 is a block diagram showing the functional configuration of the spectrogram setting unit 22. The spectrogram setting unit 22 generates the target intensity spectrogram A43 regarding the optical pulse train Pb including a plurality of optical pulses (for example, the above-described optical pulses $Pb_1$ to $Pb_3$) having time differences therebetween and having different center wavelengths from each other. As shown in FIG. 19, the spectrogram setting unit 22 includes a waveform function setting unit 101, a Fourier transform unit 102, a spectrogram transform unit 103, and a target generation unit 104.

Figure 20A:
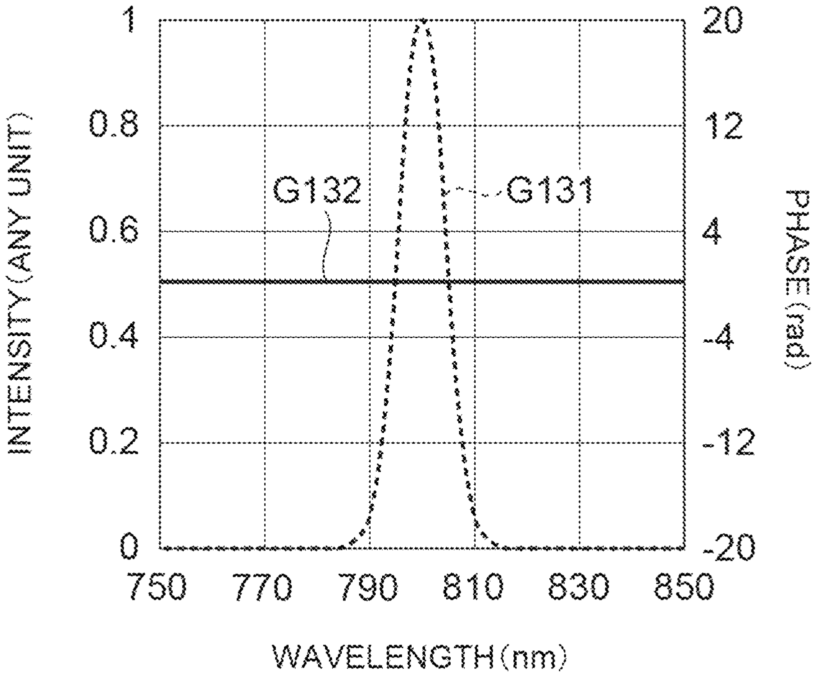
FIG. 20A is a graph showing, as an example of a target waveform function, an intensity spectrum function and a phase spectrum function of a target waveform function for one optical pulse shown in FIGS. 6A and 6B.

The waveform function setting unit 101 sets a target waveform function in the frequency domain, which includes an intensity spectrum function and a phase spectrum function, for each optical pulse. For example, the waveform function setting unit 101 sets a target waveform function for the optical pulse $Pb_1$, sets another target waveform function for the optical pulse $Pb_2$, and sets still another target waveform function for the optical pulse $Pb_3$. For example, the parameters of the target waveform function are as follows.

a) Shape (for example, Gaussian) of the intensity spectrum function of each optical pulse
b) Amount of spectral energy of the intensity spectrum function of each optical pulse
c) Bandwidth (full width at half maximum) λs of the intensity spectrum function of each optical pulse
d) Center wavelength of the intensity spectrum function of each optical pulse
e) Phase spectrum function of each optical pulse In addition, when the spectral phase of each optical pulse is linear with respect to frequency, the slope of the linear function corresponds to the amount of time shift of each optical pulse. FIG. 20A is a graph showing, as an example of the target waveform function, an intensity spectrum function G131 and a phase spectrum function G132 of the target waveform function for the optical pulse $Pb_2$ shown in FIGS. 6A and 6B. In FIG. 20A, the horizontal axis indicates wavelength (nm), and the vertical axis indicates the intensity value (any unit) of the intensity spectrum function G131 and the phase value (rad) of the phase spectrum function G132. This example is a target waveform function for the optical pulse $Pb_2$ located at the center among the three optical pulses $Pb_1$ to $Pb_3$ that are equally spaced in time from each other, so that the slope of the phase spectrum function G132 (that is, the amount of time shift) is zero.

Figure 20B:
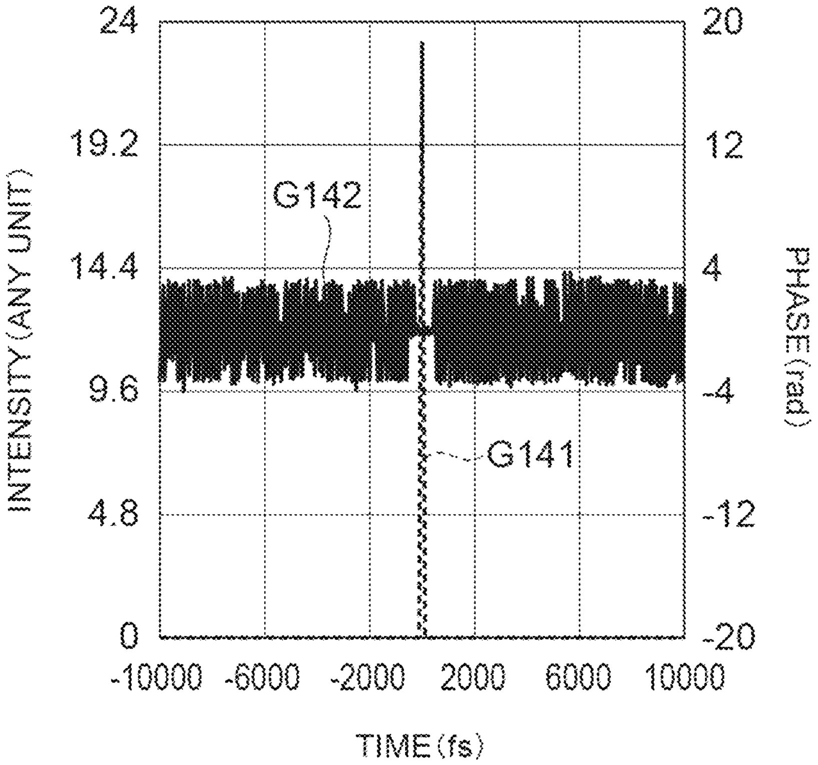
FIG. 20B is a graph showing, as an example of a waveform function in the temporal domain, a temporal intensity waveform function and a temporal phase waveform function generated from the target waveform function shown in FIG. 20A.

The Fourier transform unit 102 transforms the target waveform function of each of the plurality of optical pulses into a waveform function in the temporal domain including a temporal intensity waveform function and a temporal phase waveform function. FIG. 20B is a graph showing, as an example of the waveform function in the temporal domain, a temporal intensity waveform function G141 and a temporal phase waveform function G142 generated from the target waveform function shown in FIG. 20A. In FIG. 20B, the horizontal axis indicates time (fs), and the vertical axis indicates the intensity value (any unit) of the temporal intensity waveform function G141 and the phase value (rad) of the temporal phase waveform function G142.

Figure 21A:
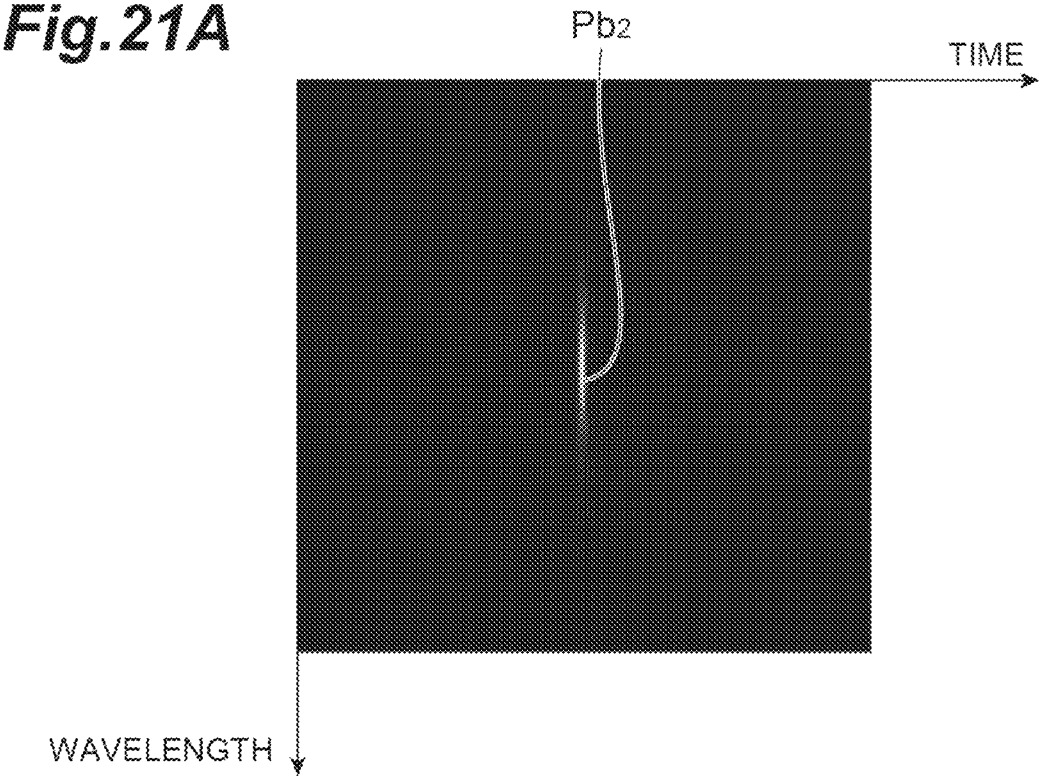
FIG. 21A is a diagram showing, as an example of an intensity spectrogram, an intensity spectrogram generated from the waveform function shown in FIG. 20B.

The spectrogram transform unit 103 generates an intensity spectrogram from the temporal domain waveform function of each of the plurality of optical pulses. FIG. 21A is a diagram showing, as an example of the intensity spectrogram, an intensity spectrogram generated from the waveform function shown in FIG. 20B. In addition, the intensity spectrogram generation method and the definition of the spectrogram are the same as those described in the spectrogram transform unit 261 of the preliminary data generation unit 23 described above. In addition, also in the spectrogram transform unit 103, other temporal frequency transforms (for example, wavelet transform) may be used without being limited to the STFT.

Figure 21B:
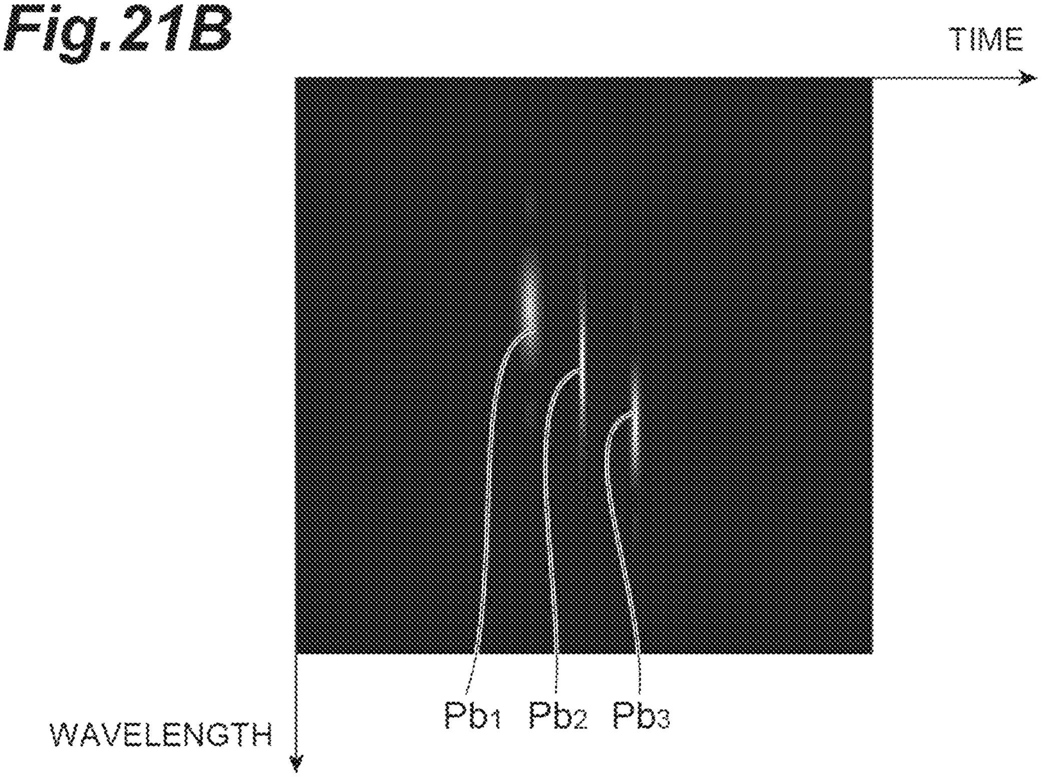
FIG. 21B is a diagram showing, as an example, an intensity spectrogram obtained by superimposing intensity spectrograms for three optical pulses on each other.

The target generation unit 104 generates the intensity spectrogram A43 by superimposing the intensity spectrograms of the plurality of optical pulses on each other. FIG. 21B is a diagram showing, as an example, the intensity spectrogram A43 obtained by superimposing intensity spectrograms for the three optical pulses $Pb_1$ to $Pb_3$ on each other. In addition, the target generation unit 104 may multiply the intensity spectrogram obtained by superimposing the intensity spectrograms of the plurality of optical pulses by a correction coefficient. The correction coefficient is, for example, a coefficient for approximating the spectral intensity distribution of the generated target intensity spectrogram A43 to the spectral intensity distribution of the optical pulse of the input light La.

Figure 22:
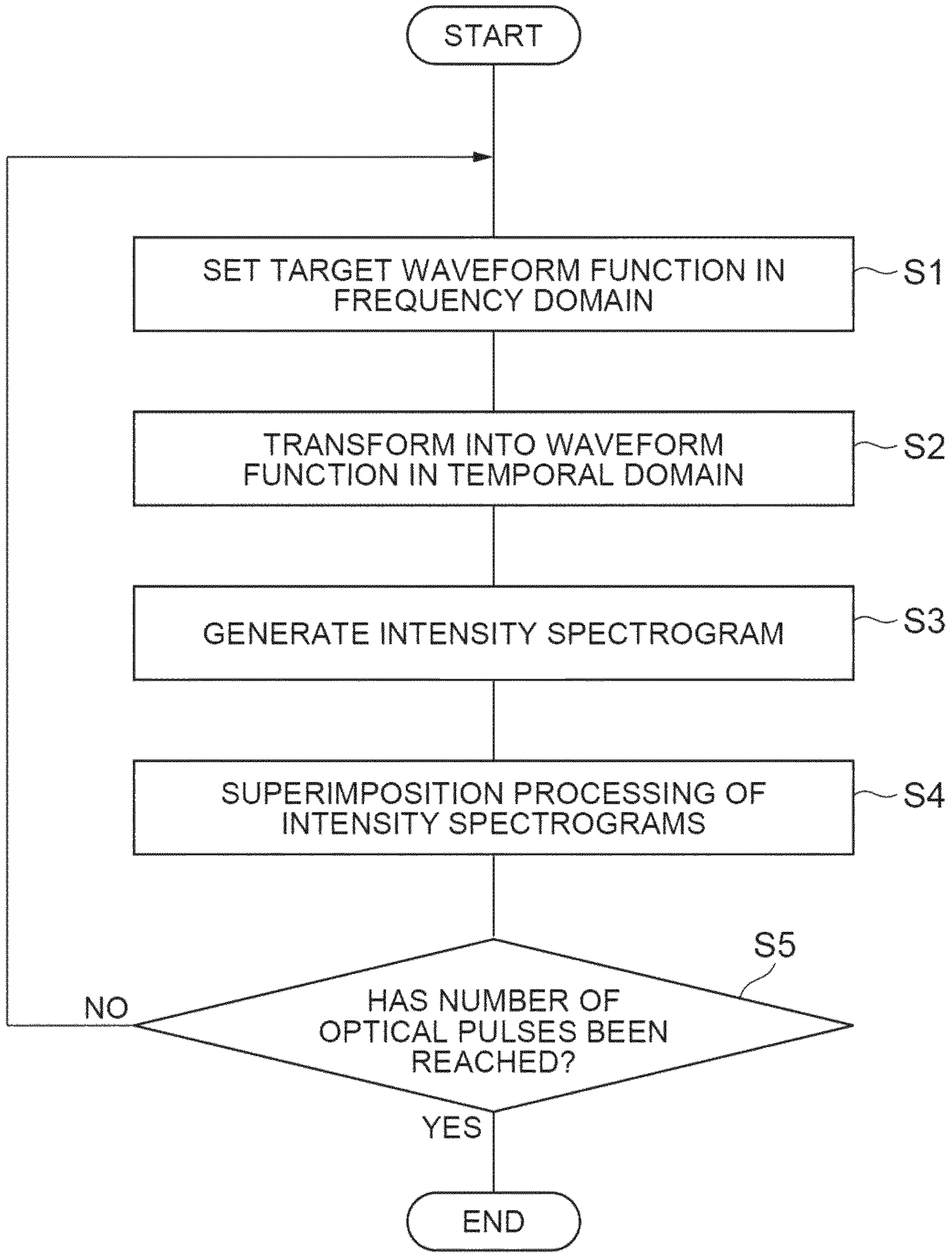
FIG. 22 is a flowchart showing a method for generating an intensity spectrogram.

FIG. 22 is a flowchart showing a method for generating the intensity spectrogram A43. The target intensity spectrogram generation program of the present embodiment causes a computer to execute the following steps.

First, in waveform function setting step S1, a target waveform function in the frequency domain including an intensity spectrum function and a phase spectrum function is set for one optical pulse among a plurality of optical pulses. In Fourier transform step S2, the target waveform function of the one optical pulse is transformed into a waveform function in the temporal domain including a temporal intensity waveform function and a temporal phase waveform function. In spectrogram transform step S3, an intensity spectrogram is generated from the waveform function in the temporal domain generated in the Fourier transform step S2. In target generation step S4, the intensity spectrogram generated in the spectrogram transform step S3 is superimposed on the target intensity spectrogram. The above-described waveform function setting step S1, Fourier transform step S2, spectrogram transform step S3, and target generation step S4 are repeated by the same number of repetitions as the number of optical pulses (step S5). As a result, the intensity spectrogram A43 is generated. In addition, without being limited to this example, for example, processes for a plurality of optical pulses may be performed at once in each of the waveform function setting step S1, Fourier transform step S2, and spectrogram transform step S3, and then the plurality of generated intensity spectrograms may be superimposed in the target generation step S4.

According to the spectrogram setting unit 22 described above, it is possible to appropriately generate the target intensity spectrogram A43 for making the center wavelength different for each of the plurality of pulses included in the optical pulse train Pb.

Figure 23:
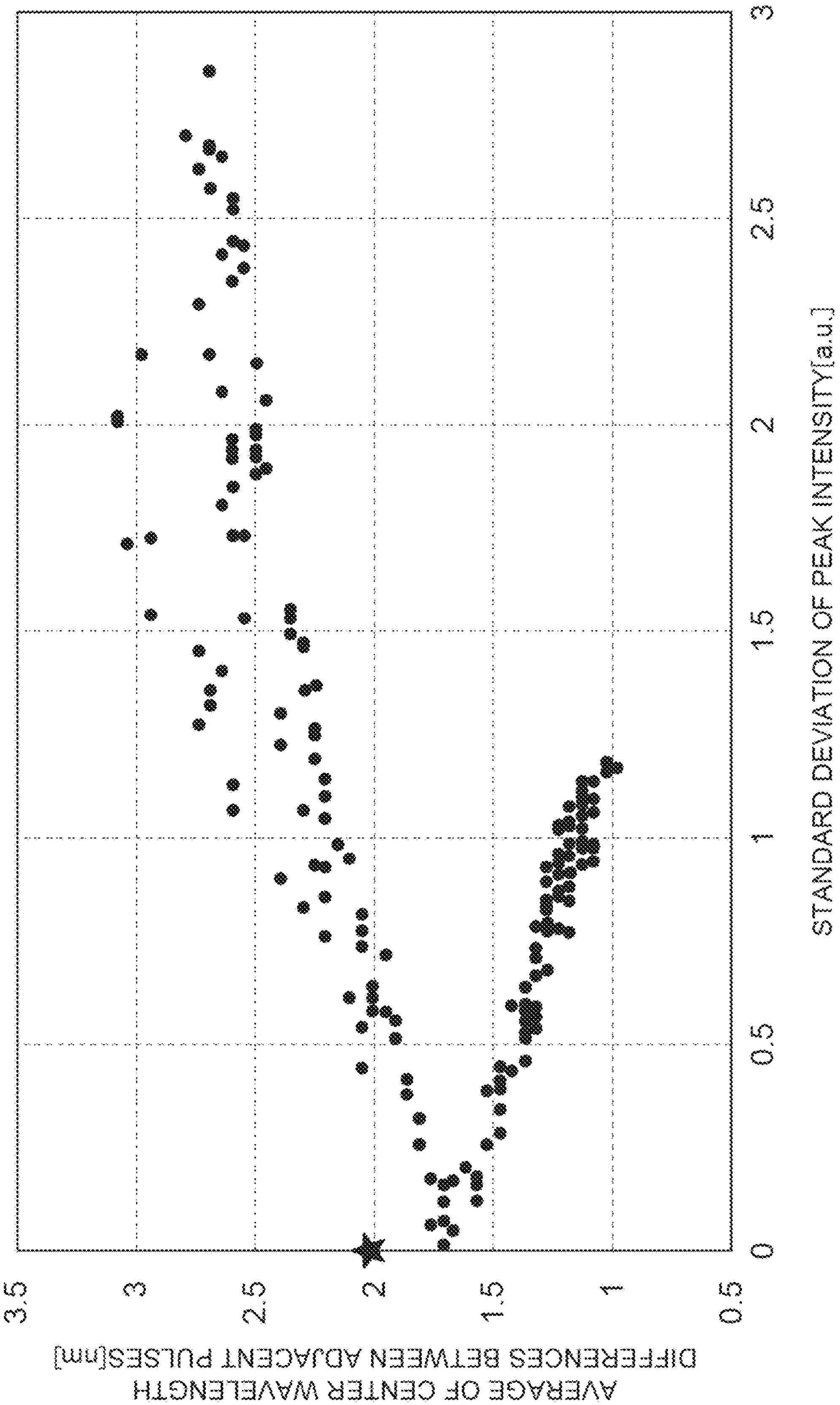
FIG. 23 is a graph obtained by plotting the relationship between a center wavelength difference between a plurality of pulses and a variation in peak intensity of a plurality of pulses of light which is actually obtained by presenting data obtained using the target intensity spectrogram to the spatial light modulator, for each of a plurality of initial phase spectrum functions.
Figure 24:
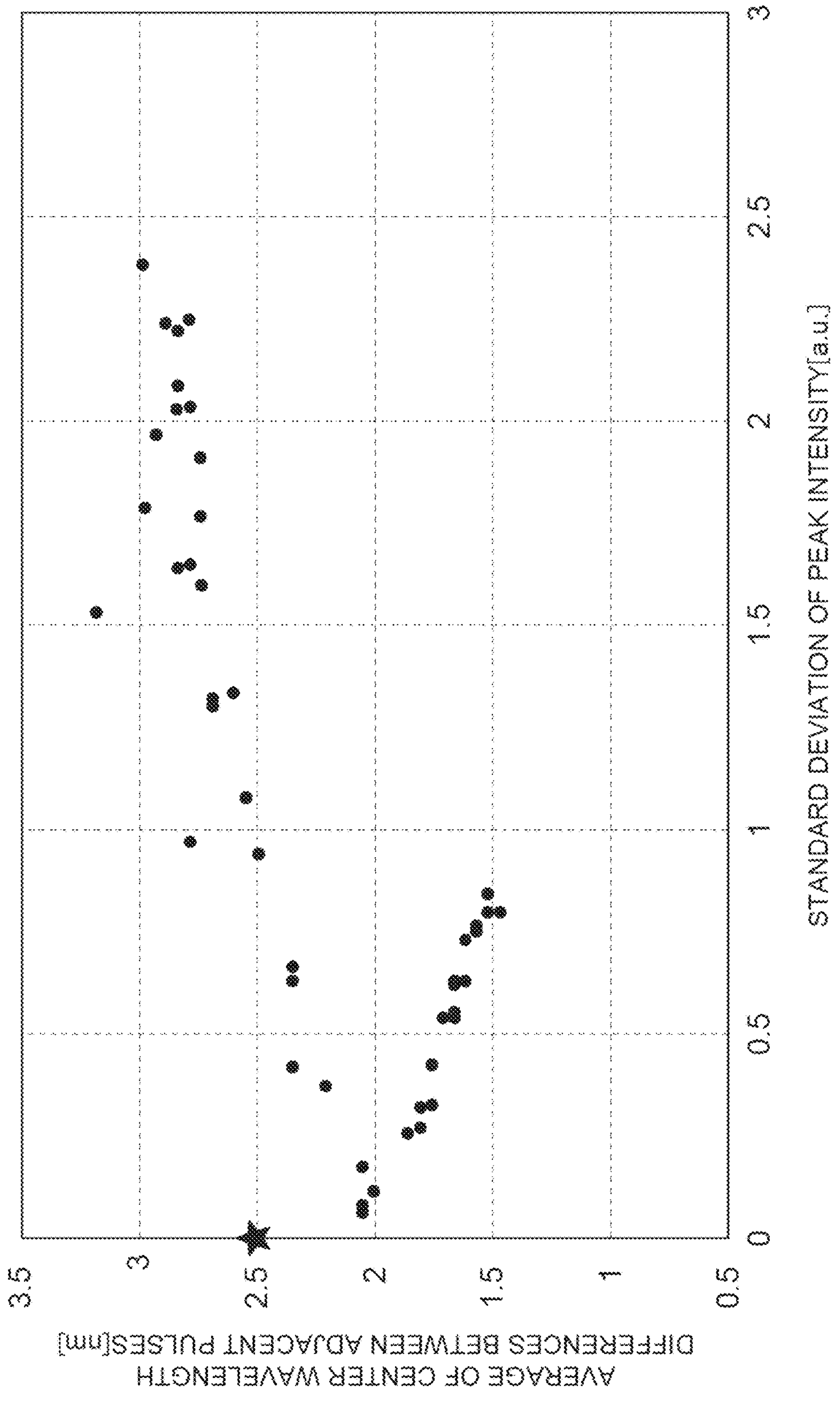
FIG. 24 is a graph obtained by plotting the relationship between a center wavelength difference between a plurality of pulses and a variation in peak intensity of a plurality of pulses of light which is actually obtained by presenting data obtained using the target intensity spectrogram to the spatial light modulator, for each of a plurality of initial phase spectrum functions.
Figure 25:
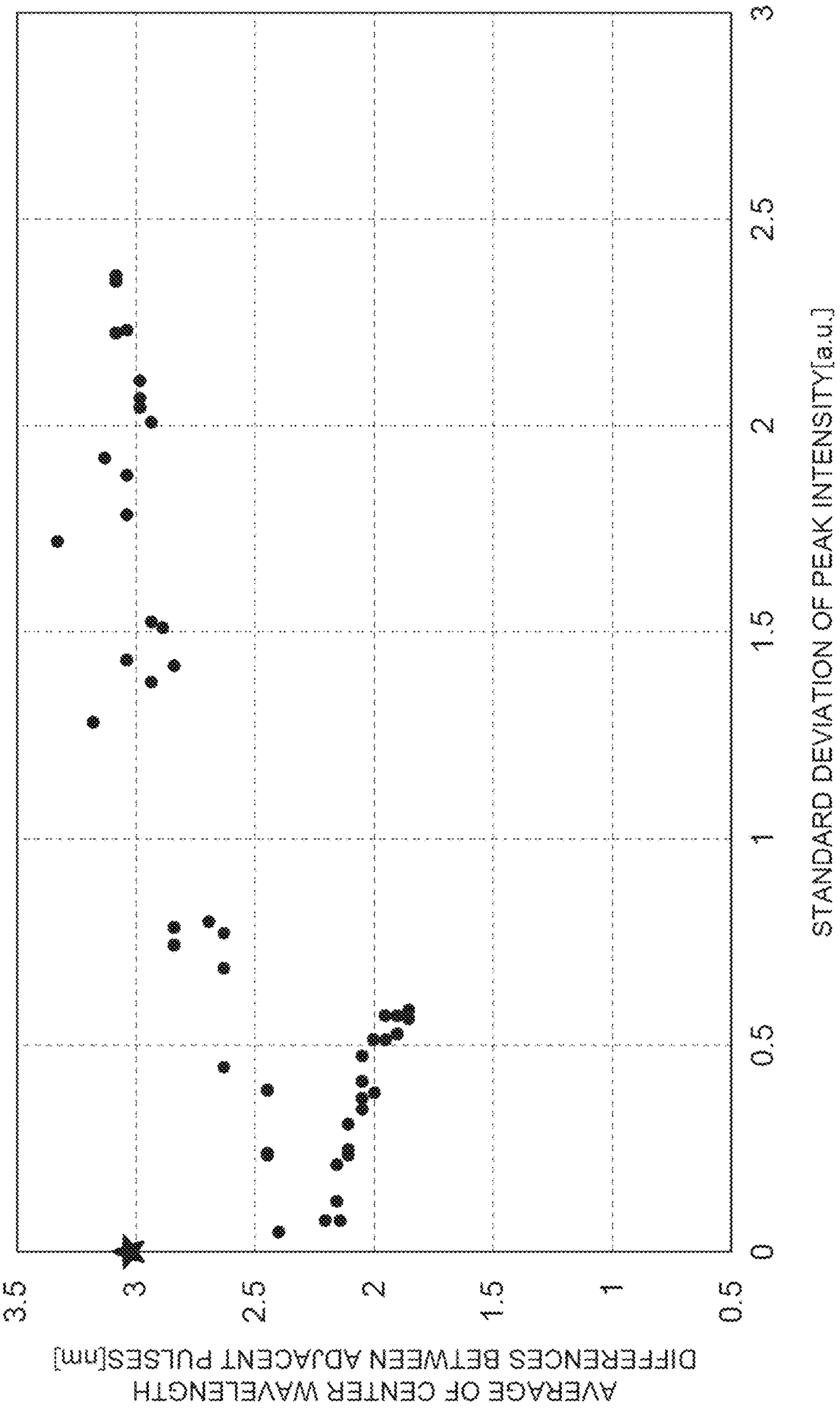
FIG. 25 is a graph obtained by plotting the relationship between a center wavelength difference between a plurality of pulses and a variation in peak intensity of a plurality of pulses of light which is actually obtained by presenting data obtained using the target intensity spectrogram to the spatial light modulator, for each of a plurality of initial phase spectrum functions.

FIGS. 23 to 25 are graphs obtained by plotting the relationship between a center wavelength difference between a plurality of pulses and a variation in peak intensity of a plurality of pulses of light, which is actually obtained by presenting data obtained using the target intensity spectrogram A43 to the SLM 14, for each of a plurality of initial phase spectrum functions $\Phi_0(\omega)$. In FIGS. 23 to 25, the vertical axis indicates the average value (nm) of the center wavelength difference between a plurality of pulses, and the horizontal axis indicates the standard deviation (any unit) of the peak intensity of the plurality of pulses. FIG. 23 shows a case where the center wavelength difference between a plurality of pulses is set to 2 nm when generating the target intensity spectrogram A43. FIGS. 24 and 25 show cases where the center wavelength difference between a plurality of pulses is set to 2.5 nm and 3 nm, respectively, when generating the target intensity spectrogram A43. In addition, the set value of the center wavelength difference between a plurality of pulses is indicated by an asterisk in the diagrams.

Referring to FIGS. 23 to 25, it can be seen that the center wavelength difference between a plurality of pulses and the variation in peak intensity change depending on the initial phase spectrum function $\Phi_0(\omega)$. Then, it can be seen that the variation in peak intensity is minimized when the center wavelength difference reaches a predetermined value and the variation in peak intensity increases as the center wavelength difference is away from the value.

In addition, referring to FIGS. 23 to 25, it can be seen that the value of the center wavelength difference between a plurality of pulses when the variation in peak intensity is minimized is significantly smaller than the value of the center wavelength difference set when generating the target intensity spectrogram A43. For example, as shown in FIG. 23, when the center wavelength difference set when generating the target intensity spectrogram A43 is 2 nm, the value of the center wavelength difference between a plurality of pulses when the variation in peak intensity is minimized is 1.7 nm, which is 15% smaller than the set center wavelength difference (2 nm). In addition, as shown in FIG. 24, when the center wavelength difference set when generating the target intensity spectrogram A43 is 2.5 nm, the value of the center wavelength difference between a plurality of pulses when the variation in peak intensity is minimized is 2.1 nm, which is 16% smaller than the set center wavelength difference (2.5 nm). In addition, as shown in FIG. 25, when the center wavelength difference set when generating the target intensity spectrogram A43 is 3 nm, the value of the center wavelength difference between a plurality of pulses when the variation in peak intensity is minimized is 2.3 nm, which is 23% smaller than the set center wavelength difference (3 nm).

From this, it can be seen that, when the spectrogram setting unit 22 generates the target intensity spectrogram A43, the center wavelength difference between a plurality of optical pulses in the target intensity spectrogram A43 is preferably set to be larger than the target center wavelength difference between a plurality of optical pulses (for example, larger than 1.1 times the target center wavelength difference between a plurality of optical pulses). The target center wavelength difference between a plurality of optical pulses is input by the operator through the input device 64 shown in FIG. 8, for example. By setting the center wavelength difference between a plurality of optical pulses in the target intensity spectrogram A43 in this manner, the center wavelength difference between a plurality of optical pulses in the optical pulse train Pb can be realized more accurately.

In addition, when the center wavelength difference between a plurality of optical pulses in the target intensity spectrogram A43 is set to be larger than the target center wavelength difference as described above, it is preferable that the center wavelength difference is smaller than a value obtained by dividing the wavelength band of the input light La to the SLM 14 by a value obtained by subtracting 1 from the number of pulses in the optical pulse train Pb. For example, when the number of pulses in the optical pulse train Pb is 3, it is preferable that the center wavelength difference between a plurality of optical pulses in the target intensity spectrogram A43 is smaller than ½ of the wavelength band of the input light La. By setting the center wavelength difference between a plurality of optical pulses in the target intensity spectrogram A43 in this manner, the center wavelength difference between a plurality of optical pulses in the optical pulse train Pb can be realized more accurately. For example, when the wavelength bandwidth of the spectrum of the input light La is 10 nm and the number of pulses in the optical pulse train Pb is 3, the upper limit of the set value of the center wavelength difference is 5 nm.

Modification Examples

Figure 26:
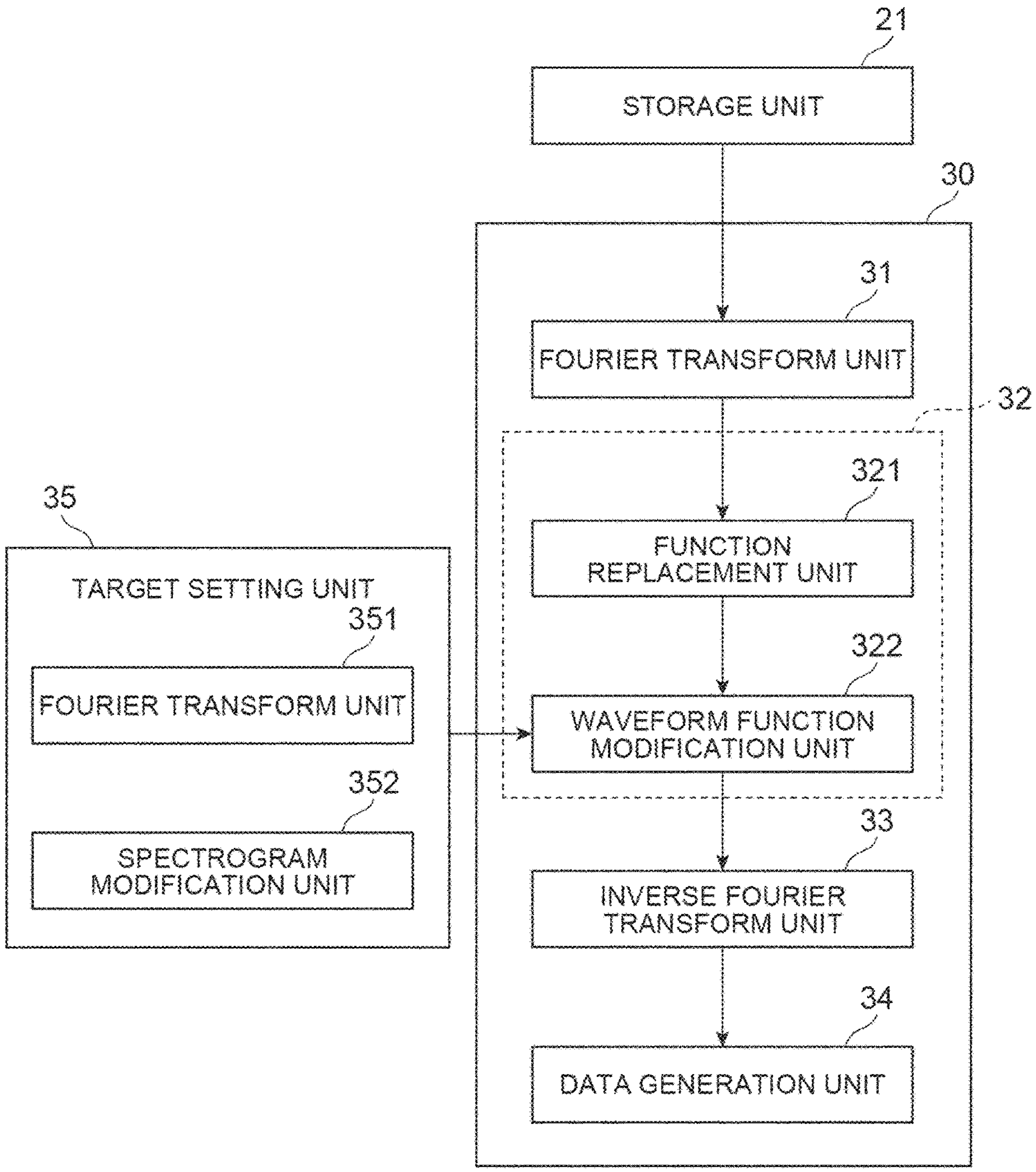
FIG. 26 is a block diagram showing the internal configuration of a target setting unit and a preliminary data generation unit according to a modification example.

Next, modification examples of the spectrogram setting unit 22 and the preliminary data generation unit 23 will be described. FIG. 26 is a block diagram showing the internal configuration of the target setting unit 35 and the preliminary data generation unit 30 according to a modification example. As shown in FIG. 26, the preliminary data generation unit 30 includes a Fourier transform unit 31 (first transform unit), a function transform unit 32 (second transform unit), an inverse Fourier transform unit 33 (third transform unit), and a data generation unit 34. The function transform unit 32 includes a function replacement unit 321 and a waveform function modification unit 322. In addition, the target setting unit 35 includes a Fourier transform unit 351 and a spectrogram modification unit 352. The functions of these components will be detailed later.

Figure 27:
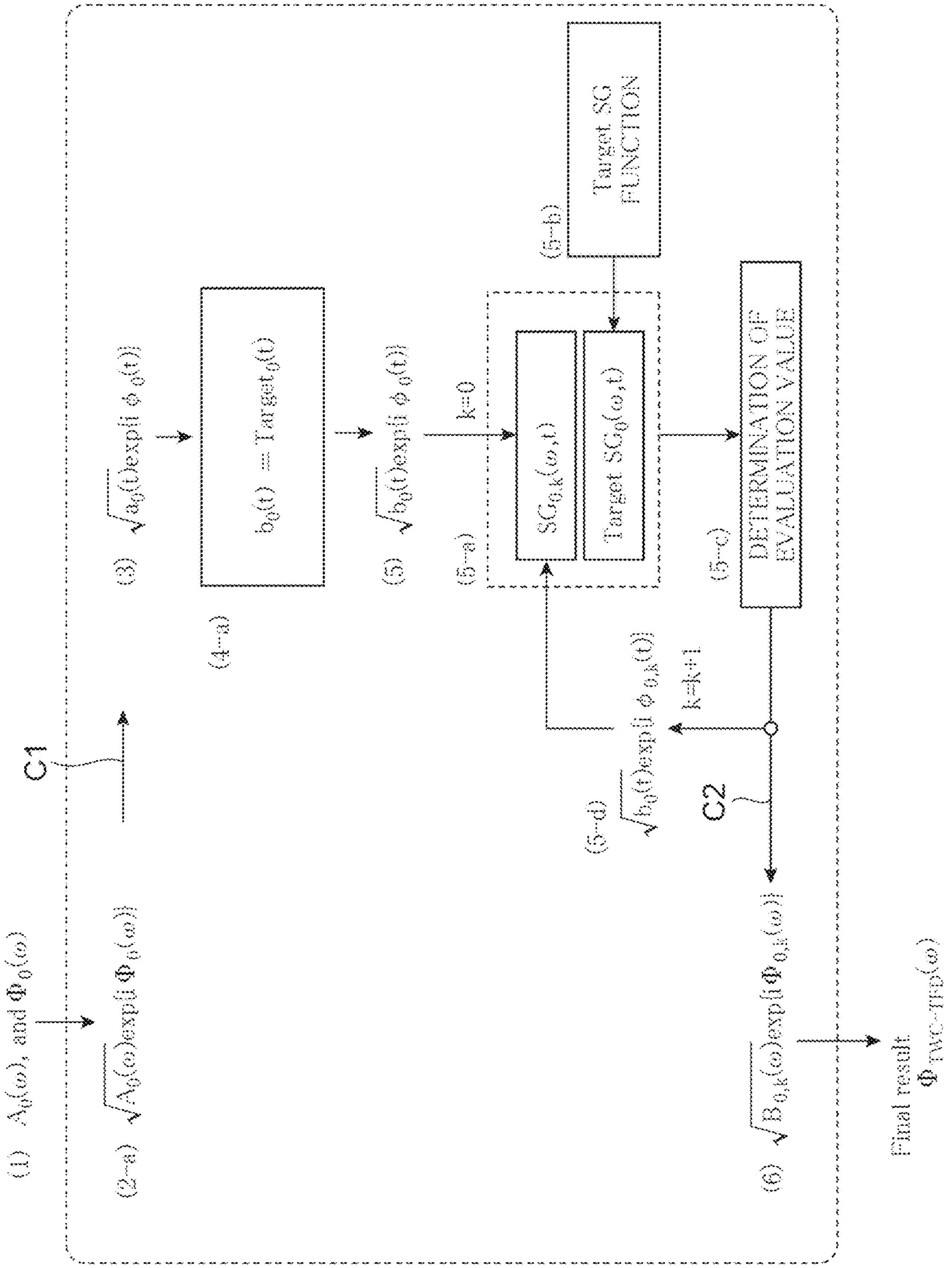
FIG. 27 is a diagram showing a procedure for calculating a phase spectrum function in the preliminary data generation unit.

FIG. 27 is a diagram showing a procedure for calculating the phase spectrum function in the preliminary data generation unit 30. First, the initial intensity spectrum function $A_0(\omega)$ and the initial phase spectrum function $\Phi_0(\omega)$, which are functions of the frequency $\omega$, are prepared (process number (1) in the diagram). For example, the initial intensity spectrum function $A_0(\omega)$ indicates the intensity spectrum of the input light La, but is not limited thereto. In addition, the initial phase spectrum function $\Phi_0(\omega)$ is sequentially selected from a plurality of initial phase spectrum functions $\Phi_0(\omega)$ stored in the storage unit 21, as in the embodiment described above.

Then, a first waveform function (7) in the frequency domain including the initial intensity spectrum function $A_0(\omega)$ and the initial phase spectrum function $\Phi_0(\omega)$ is prepared (process number (2-a)). Here, i is an imaginary number.

[Formula 7]

$$\sqrt{A_0(\omega)}\exp\{i\Phi_0(\omega)\} \tag{7}$$

Then, the Fourier transform unit 31 performs Fourier transform from the frequency domain to the temporal domain on the function (7) (arrow C1 in the diagram). As a result, a second waveform function (8) in the temporal domain including a temporal intensity waveform function $a_0(t)$ and a temporal phase waveform function $\phi_0(t)$ is obtained (Fourier transform step, process number (3) in the diagram).

[Formula 8]

$$\sqrt{a_0(t)}\exp\{i\phi_0(t)\} \tag{8}$$

Then, as shown in the following Formula (9), the function replacement unit 321 of the function transform unit 32 substitutes a temporal intensity waveform function $Target_0(t)$ indicating the target temporal waveform into a temporal intensity waveform function $b_0(t)$ (process number (4-a)).

[Formula 9]

$$b_0(t) = \mathrm{Target}_0(t) \tag{9}$$

Then, as shown in the following Formula (10), the function replacement unit 321 of the function transform unit 32 replaces the temporal intensity waveform function $a_0(t)$ with the temporal intensity waveform function $b_0(t)$. That is, the temporal intensity waveform function $a_0(t)$ included in the above function (8) is replaced with the temporal intensity waveform function $Target_0(t)$ based on the target temporal waveform (function replacement step, process number (5) in the diagram).

[Formula 10]

$$\sqrt{b_0(t)}\exp\{i\phi_0(t)\} \tag{10}$$

Then, the waveform function modification unit 322 of the function transform unit 32 modifies the second waveform function so that the spectrogram of the replaced second waveform function (10) approaches a target spectrogram generated in advance according to the desired wavelength band. First, by subjecting the replaced second waveform function (10) to time-frequency transform, the second waveform function (10) is transformed into a spectrogram $SG_{0,k}(\omega, t)$ (process number (5-a) in the diagram). The subscript k indicates the k-th transform process.

In addition, a target spectrogram $TargetSG_0(\omega, t)$ generated in advance according to a desired wavelength band is read out from the target setting unit 35. The target spectrogram $TargetSG_0(\omega, t)$ has approximately the same value as the target temporal waveform (temporal intensity waveform and frequency components forming the temporal intensity waveform), and is generated in the target spectrogram function of process number (5-b).

Then, the waveform function modification unit 322 of the function transform unit 32 performs pattern matching between the spectrogram $SG_{0,k}(\omega, t)$ and the target spectrogram $TargetSG_0(\omega, t)$ to check the degree of similarity (how much these match each other). In the present embodiment, an evaluation value is calculated as an index indicating the degree of similarity. Then, in the subsequent process number (5-c), it is determined whether or not the obtained evaluation value satisfies predetermined end conditions. If the conditions are satisfied, the process proceeds to the process number (6), and if the conditions are not satisfied, the process proceeds to the process number (5-d). In the process number (5-d), the temporal phase waveform function $\phi_0(t)$ included in the second waveform function is changed to any temporal phase waveform function $\phi_{0,k}(t)$. The second waveform function after changing the temporal phase waveform function is transformed again into a spectrogram by time-frequency transform such as STFT. Thereafter, the process numbers (5-a) to (5-c) described above are repeated. In this manner, the second waveform function is modified such that the spectrogram $SG_{0,k}(\omega, t)$ gradually approaches the target spectrogram $TargetSG_0(\omega, t)$ (waveform function modification step).

Thereafter, the inverse Fourier transform unit 33 performs inverse Fourier transform on the modified second waveform function (arrow C2 in the diagram) to generate a third waveform function (11) in the frequency domain (inverse Fourier transform step, process number (6) in the diagram).

[Formula 11]

$$\sqrt{B_{0,k}(\omega)}\exp\{i\Phi_{0,k}(\omega)\} \tag{11}$$

The phase spectrum function $\Phi_{0,k}(\omega)$ included in the third waveform function (11) becomes a desired phase spectrum function $\Phi_{TWC\text{-}TFD}(\omega)$ finally obtained. This phase spectrum function $\Phi_{TWC\text{-}TFD}(\omega)$ is provided to the data generation unit 34.

The data generation unit 34 calculates a phase modulation pattern (for example, a computer-generated hologram) for applying the spectral phase indicated by the phase spectrum function $\Phi_{TWC\text{-}TFD}(\omega)$ to the input light La (data generation step).

Figure 28:
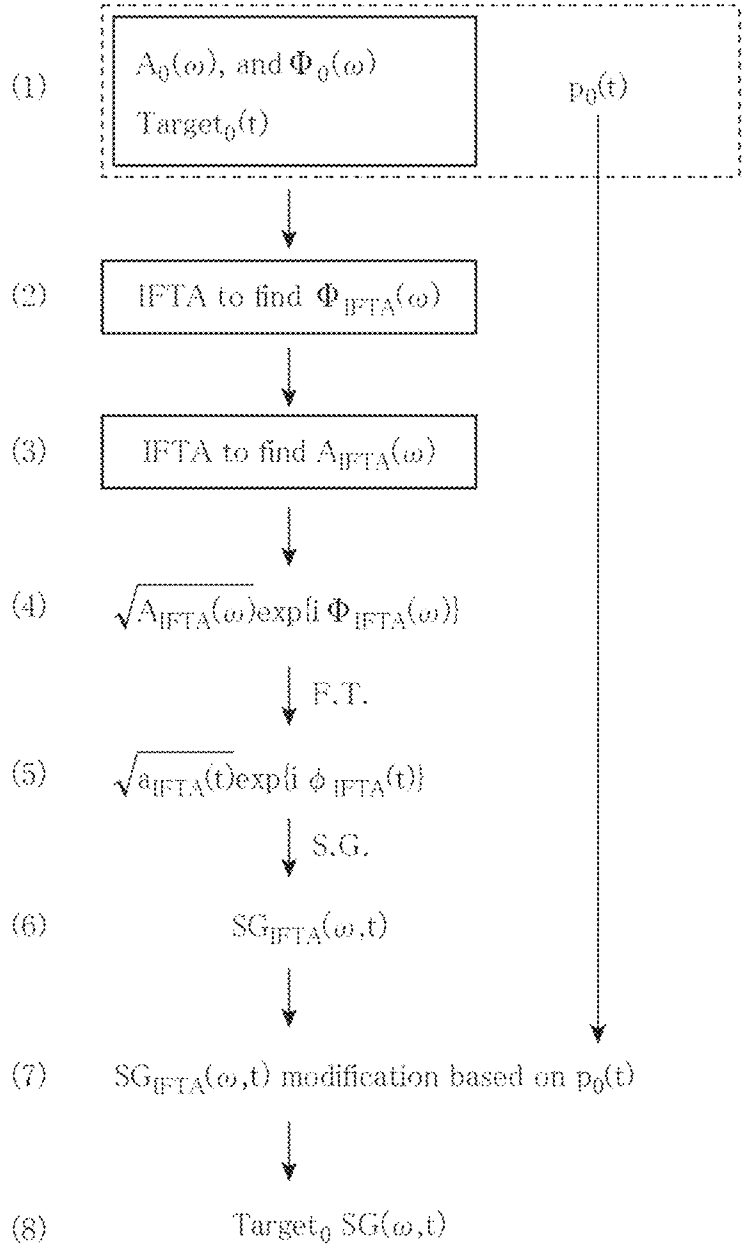
FIG. 28 is a diagram showing an example of a procedure for generating a target spectrogram in the target setting unit.

Here, FIG. 28 is a diagram showing an example of a procedure for generating the target spectrogram $TargetSG_0(\omega, t)$ in the target setting unit 35. Since the target spectrogram $TargetSG_0(\omega, t)$ indicates a target temporal waveform (temporal intensity waveform and frequency components (wavelength band components) forming the temporal intensity waveform), generating the target spectrogram is an extremely important step for controlling frequency components (wavelength band components). As shown in FIG. 28, the target setting unit 35 first inputs a spectral waveform (initial intensity spectrum function $A_0(\omega)$ and initial phase spectrum function $\Phi_0(\omega)$) and a desired temporal intensity waveform function $Target_0(t)$. In addition, a temporal function $p_0(t)$ including desired frequency (wavelength) band information is input (process number (1)).

Then, the target setting unit 35 calculates a phase spectrum function $\Phi_{IFTA}(\omega)$ for realizing the temporal intensity waveform function $Target_0(t)$ by using, for example, a general iterative Fourier transform method or the method described in Non Patent Literature 1 or 2 (process number (2)).

Figure 29:
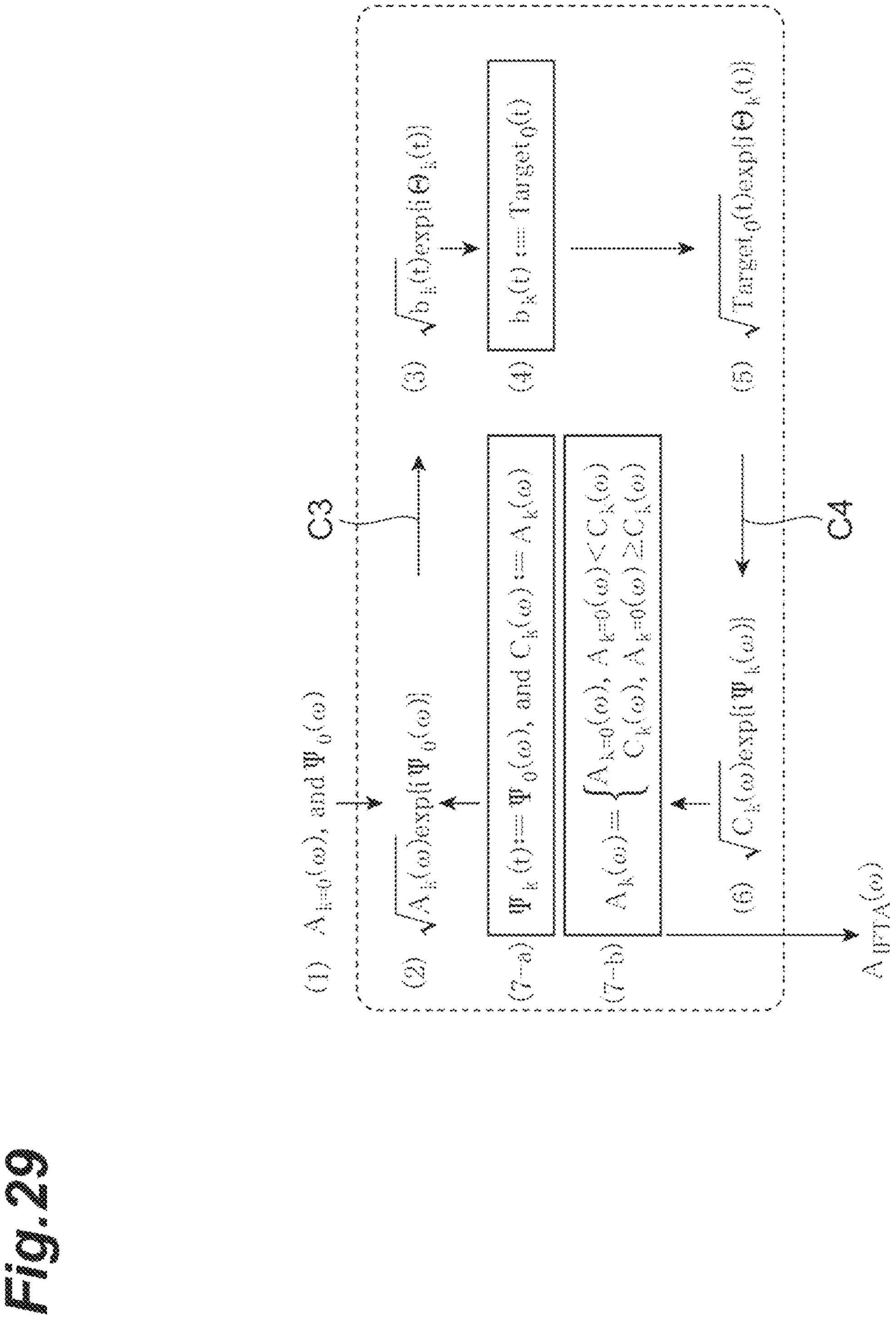
FIG. 29 is a diagram showing an example of a procedure for calculating an intensity spectrum function.

Then, the target setting unit 35 calculates an intensity spectrum function $A_{IFTA}(\omega)$ for realizing the temporal intensity waveform function $Target_0(t)$ by using the iterative Fourier transform method using the previously obtained phase spectrum function $\Phi_{IFTA}(\omega)$ (process number (3)). Here, FIG. 29 is a diagram showing an example of the procedure for calculating the intensity spectrum function $A_{IFTA}(\omega)$.

First, an initial intensity spectrum function $A_{k=0}(\omega)$ and a phase spectrum function $\Psi_0(\omega)$ are prepared (process number (1) in the diagram). Then, a waveform function (12) in the frequency domain including the intensity spectrum function $A_k(\omega)$ and the phase spectrum function $\Psi_0(\omega)$ is prepared (process number (2) in the diagram).

[Formula 12]

$$\sqrt{A_k(\omega)}\exp\{i\Psi_0(\omega)\} \tag{12}$$

The subscript k indicates after the k-th Fourier transform process. Before the first Fourier transform process, the above-described initial intensity spectrum function $A_{k=0}(\omega)$ is used as the intensity spectrum function $A_k(\omega)$. i is an imaginary number.

Then, the above function (12) is subjected to Fourier transform from the frequency domain to the temporal domain (arrow C3 in the diagram). As a result, a waveform function (13) in the frequency domain including a temporal intensity waveform function $b_k(t)$ is obtained (process number (3) in the diagram).

[Formula 13]

$$\sqrt{b_k(t)}\exp\{i\Theta_k(t)\} \tag{13}$$

Then, the temporal intensity waveform function $b_k(t)$ included in the above function (13) is replaced with the temporal intensity waveform function $\mathrm{Target}_0(t)$ based on a desired waveform (process numbers (4) and (5) in the diagram).

[Formula 14]

$$b_k(t) := \mathrm{Target}_0(t) \tag{14}$$

[Formula 15]

$$\sqrt{\mathrm{Target}_0(t)}\exp\{i\Theta_k(t)\} \tag{15}$$

Then, the above function (15) is subjected to inverse Fourier transform from the temporal domain to the frequency domain (arrow C4 in the diagram). As a result, a waveform function (16) in the frequency domain including an intensity spectrum function $C_k(\omega)$ and a phase spectrum function $\Psi_k(\omega)$ is obtained (process number (6) in the diagram).

[Formula 16]

$$\sqrt{C_k(\omega)}\exp\{i\Psi_k(\omega)\} \tag{16}$$

Then, in order to constrain the phase spectrum function $\Psi_k(\omega)$ included in the above function (16), the phase spectrum function $\Psi_k(\omega)$ is replaced with the initial phase spectrum function $\Psi_0(\omega)$ (process number (7-a) in the diagram).

[Formula 17]

$$\Psi_k(\omega) := \Psi_0(\omega) \tag{17}$$

In addition, the intensity spectrum function $C_k(\omega)$ in the frequency domain after the inverse Fourier transform is subjected to filtering processing based on the intensity spectrum of the input light La. Specifically, of the intensity spectrum expressed by the intensity spectrum function $C_k(\omega)$, a portion exceeding the cutoff intensity for each wavelength determined based on the intensity spectrum of the input light La is cut. For example, the cutoff intensity for each wavelength is set to match the intensity spectrum (for example, the initial intensity spectrum function $A_{k=0}(\omega)$) of the input light La. In this case, as expressed in the following Formula (18), at frequencies where the intensity spectrum function $C_k(\omega)$ is larger than the intensity spectrum function $A_{k=0}(\omega)$, the value of the intensity spectrum function $A_{k=0}(\omega)$ is taken as the value of the intensity spectrum function $A_k(\omega)$. In addition, at frequencies where the intensity spectrum function $C_k(\omega)$ is equal to or less than the intensity spectrum function $A_{k=0}(\omega)$, the value of the intensity spectrum function $C_k(\omega)$ is taken as the value of the intensity spectrum function $A_k(\omega)$ (process number (7-b) in the diagram).

[Formula 18]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \tag{18}$$

The intensity spectrum function $C_k(\omega)$ included in the above function (16) is replaced with the intensity spectrum function $A_k(\omega)$ after the filtering processing according to the above Formula (18).

Then, by repeating the above processes (1) to (7-b), the intensity spectrum shape indicated by the intensity spectrum function $A_k(\omega)$ in the waveform function can be approximated to the intensity spectrum shape corresponding to the desired temporal intensity waveform. Finally, the intensity spectrum function $A_{IFTA}(\omega)$ is obtained.

FIG. 28 is referred to again. By calculating the phase spectrum function $\Phi_{IFTA}(\omega)$ and the intensity spectrum function $A_{IFTA}(\omega)$ in the process numbers (2) and (3) described above, a third waveform function (19) in the frequency domain including these functions is obtained (process number (4) in the diagram).

[Formula 19]

$$\sqrt{A_{IFTA}(\omega)}\exp\{i\Phi_{IFTA}(\omega)\} \tag{19}$$

The Fourier transform unit 351 of the target setting unit 35 performs Fourier transform on the above waveform function (19). As a result, a fourth waveform function (20) in the temporal domain is obtained (process number (5) in the diagram).

[Formula 20]

$$\sqrt{a_{IFTA}(t)}\exp\{i\phi_{IFTA}(t)\} \tag{20}$$

The spectrogram modification unit 352 of the target setting unit 35 transforms the fourth waveform function (20) into a spectrogram $SG_{IFTA}(\omega, t)$ by time-frequency transform (process number (6)). Then, in the process number (7), by modifying the spectrogram $SG_{IFTA}(\omega, t)$ based on the temporal function $p_0(t)$ including the desired frequency (wavelength) band information, the target spectrogram $\mathrm{TargetSG}_0(\omega, t)$ is generated. For example, a characteristic pattern appearing in the spectrogram $SG_{IFTA}(\omega, t)$ configured by two-dimensional data is partially cut out, and the frequency component of the portion is manipulated based on the temporal function $p_0(t)$. Hereinafter, a specific example thereof will be described in detail.

For example, a case is considered in which triple pulses having a time interval of 2 picoseconds are set as the desired temporal intensity waveform function $\mathrm{Target}_0(t)$. At this time, the resulting spectrogram $SG_{IFTA}(\omega, t)$ is shown in FIG. 7A. If it is desired to control only the temporal intensity waveform of the optical pulse train Pb (it is desired to simply obtain triple pulses), there is no need to manipulate the wavelength band of the optical pulses $Pb_1$, $Pb_2$, and $Pb_3$ included in the spectrogram $SG_{IFTA}(\omega, t)$. However, if it is desired to control the wavelength band of each pulse, it is necessary to manipulate the optical pulses $Pb_1$, $Pb_2$, and $Pb_3$. That is, as shown in FIG. 6A, the optical pulses $Pb_1$, $Pb_2$, and $Pb_3$ are moved independently from each other in a direction along the wavelength axis (vertical axis). Such a change in the wavelength band of each pulse is performed based on the temporal function $p_0(t)$.

For example, when writing the temporal function $p_0(t)$ so that the peak wavelength of the optical pulse $Pb_2$ is fixed at 800 nm and the peak wavelengths of the optical pulses $Pb_1$ and $Pb_3$ are translated by −2 nm and +2 nm, respectively, the spectrogram $SG_{IFTA}(\omega, t)$ changes to the target spectrogram $TargetSG_0(\omega, t)$ shown in FIG. 6A. For example, by subjecting the spectrogram to such processing, it is possible to generate a target spectrogram in which the wavelength band of each pulse is arbitrarily controlled without changing the shape of the temporal intensity waveform.

The data generation device, the data generation method, and the data generation program according to the present disclosure are not limited to the embodiments described above, and various other modifications are possible. For example, although the case of generating an optical pulse train including a plurality of optical pulses having time differences therebetween and having different center wavelengths has been mainly described in the above embodiment, the data generation device, the data generation method, and the data generation program according to the present disclosure are effective even when generating an optical pulse train including a plurality of optical pulses having time differences therebetween and having the same center wavelength. In addition, the data generation device, the data generation method, and the data generation program according to the present disclosure are effective in controlling the waveform of light other than the optical pulse train, for example, when forming the time waveform of a single optical pulse.

What is claimed is:

1. A data generation method for controlling a spatial light modulator, the data generation method comprising:

preparing a plurality of initial phase spectrum functions;

generating each of a plurality of pieces of preliminary data for controlling the spatial light modulator by using each of the plurality of initial phase spectrum functions; and selecting at least one of the plurality of pieces of preliminary data and setting the at least one piece of preliminary data as data for controlling the spatial light modulator, wherein the generating each of the plurality of pieces of preliminary data includes: transforming a first waveform function in a frequency domain including an intensity spectrum function and a phase spectrum function into a second waveform function in a temporal domain including a temporal intensity waveform function and a temporal phase waveform function;

calculating, from the second waveform function, a third waveform function in the temporal domain that includes a temporal intensity waveform function and a temporal phase waveform function and corresponds to a target intensity spectrogram generated in advance; and transforming the third waveform function into a fourth waveform function in the frequency domain including an intensity spectrum function and a phase spectrum function, and in the generating each of the plurality of pieces of preliminary data, the transforming the first waveform function, the calculating, and the transforming the third waveform function are repeatedly performed for each of the plurality of pieces of preliminary data while replacing the first waveform function with the fourth waveform function, each of the plurality of initial phase spectrum functions is set as the phase spectrum function of the first waveform function in the transforming the first waveform function at a beginning of repeated operations, and each of the plurality of pieces of preliminary data is generated based on the phase spectrum function of the fourth waveform function obtained after the repeated operations.

2. The data generation method according to claim 1, wherein the target intensity spectrogram is an intensity spectrogram related to an optical pulse train including a plurality of optical pulses having different center wavelengths from each other.

3. The data generation method according to claim 2, wherein a center wavelength difference between the plurality of optical pulses in the target intensity spectrogram is set to be larger than a center wavelength difference between the plurality of optical pulses as a target optical pulse train.

4. The data generation method according to claim 2, wherein a center wavelength difference between the plurality of optical pulses in the target intensity spectrogram is set to be larger than 1.1 times a center wavelength difference between the plurality of optical pulses as a target optical pulse train.

5. The data generation method according to claim 2, wherein a center wavelength difference between the plurality of optical pulses in the target intensity spectrogram is set to be smaller than a value obtained by dividing a wavelength band of input light to the spatial light modulator by a value obtained by subtracting 1 from a number of pulses in the optical pulse train.

6. The data generation method according to claim 1, wherein the calculating includes:

transforming the second waveform function into an intensity spectrogram and a phase spectrogram;

replacing the intensity spectrogram with the target intensity spectrogram and constraining the phase spectrogram; and transforming the replaced intensity spectrogram and the constrained phase spectrogram into the third waveform function.

7. The data generation method according to claim 1, wherein the calculating includes:

performing, for the second waveform function, replacement of the temporal intensity waveform function based on a target waveform corresponding to the target intensity spectrogram;

modifying the second waveform function so that a spectrogram of the second waveform function approaches the target intensity spectrogram; and generating the third waveform function from the modified second waveform function.

8. A non-transitory computer readable medium storing a data generation program for controlling a spatial light modulator, the data generation program causing a computer to execute:

preparing a plurality of initial phase spectrum functions;

generating each of a plurality of pieces of preliminary data for controlling the spatial light modulator by using each of the plurality of initial phase spectrum functions; and selecting at least one of the plurality of pieces of preliminary data and setting the at least one piece of preliminary data as data for controlling the spatial light modulator, wherein the generating each of the plurality of pieces of preliminary data includes:

transforming a first waveform function in a frequency domain including an intensity spectrum function and a phase spectrum function into a second waveform function in a temporal domain including a temporal intensity waveform function and a temporal phase waveform function;

calculating, from the second waveform function, a third waveform function in the temporal domain that includes a temporal intensity waveform function and a temporal phase waveform function and corresponds to a target intensity spectrogram generated in advance; and transforming the third waveform function into a fourth waveform function in the frequency domain including an intensity spectrum function and a phase spectrum function, and in the generating each of the plurality of pieces of preliminary data, the transforming the first waveform function, the calculating, and the transforming the third waveform function are repeatedly performed for each of the plurality of pieces of preliminary data while replacing the first waveform function with the fourth waveform function, each of the plurality of initial phase spectrum functions is set as the phase spectrum function of the first waveform function in the transforming the first waveform function at a beginning of repeated operations, and each of the plurality of pieces of preliminary data is generated based on the phase spectrum function of the fourth waveform function obtained after the repeated operations.

9. A data generation device for controlling a spatial light modulator, the data generation device comprising:

a storage unit that stores a plurality of initial phase spectrum functions;

a processor that;

generates each of a plurality of pieces of preliminary data for controlling the spatial light modulator by using each of the plurality of initial phase spectrum functions;

selects at least one of the plurality of pieces of preliminary data and sets the at least one piece of preliminary data as data for controlling the spatial light modulator;

transforms a first waveform function in a frequency domain including an intensity spectrum function and a phase spectrum function into a second waveform function in a temporal domain including a temporal intensity waveform function and a temporal phase waveform function;

calculates, from the second waveform function, a third waveform function in the temporal domain that includes a temporal intensity waveform function and a temporal phase waveform function and corresponds to a target intensity spectrogram generated in advance; and transforms the third waveform function into a fourth waveform function in the frequency domain including an intensity spectrum function and a phase spectrum function, wherein the processor repeatedly performs the transforming of the first waveform function into the second waveform function, the calculating of the third waveform function, and the transforming of the third waveform function into the fourth waveform function for each of the plurality of pieces of preliminary data while replacing the first waveform function with the fourth waveform function, sets each of the plurality of initial phase spectrum functions as the phase spectrum function of the first waveform function for the transforming of the first waveform function into the second waveform function at a beginning of repeated operations, and generates each of the plurality of pieces of preliminary data based on the phase spectrum function of the fourth waveform function obtained after the repeated operations.

10. The data generation device according to claim 9, wherein the target intensity spectrogram is an intensity spectrogram related to an optical pulse train including a plurality of optical pulses having different center wavelengths from each other.

11. The data generation device according to claim 10, wherein a center wavelength difference between the plurality of optical pulses in the target intensity spectrogram is set to be larger than a center wavelength difference between the plurality of optical pulses as a target optical pulse train.

12. The data generation device according to claim 10, wherein a center wavelength difference between the plurality of optical pulses in the target intensity spectrogram is set to be larger than 1.1 times a center wavelength difference between the plurality of optical pulses as a target optical pulse train.

13. The data generation device according to claim 10, wherein a center wavelength difference between the plurality of optical pulses in the target intensity spectrogram is set to be smaller than a value obtained by dividing a wavelength band of input light to the spatial light modulator by a value obtained by subtracting 1 from a number of pulses in the optical pulse train.

14. The data generation device according to claim 9, wherein the the calculating, from the second waveform function, of the third waveform function in the temporal domain that includes the temporal intensity waveform function and the temporal phase waveform function and corresponds to the target intensity spectrogram generated in advance includes:

transforming the second waveform function into an intensity spectrogram and a phase spectrogram;

replacing the intensity spectrogram with the target intensity spectrogram and constraining the phase spectrogram; and transforming replaced intensity spectrogram and constrained phase spectrogram into the third waveform function.

15. The data generation device according to claim 9, wherein the the calculating, from the second waveform function, of the third waveform function in the temporal domain that includes the temporal intensity waveform function and the temporal phase waveform function and corresponds to the target intensity spectrogram generated in advance includes:

performing, for the second waveform function, replacement of the temporal intensity waveform function based on a target waveform corresponding to the target intensity spectrogram;

modifying the second waveform function so that a spectrogram of the second waveform function approaches the target intensity spectrogram; and generating the third waveform function from the modified second waveform function.

* * * * *